United States Patent [19]
Ramkumar et al.

[11] Patent Number: 6,161,219
[45] Date of Patent: *Dec. 12, 2000

[54] SYSTEM AND METHOD FOR PROVIDING CHECKPOINTING WITH PRECOMPILE DIRECTIVES AND SUPPORTING SOFTWARE TO PRODUCE CHECKPOINTS, INDEPENDENT OF ENVIRONMENT CONSTRAINTS

[75] Inventors: Balkrishna Ramkumar, Coralville, Iowa; Volker Strumpen, Boston, Mass.

[73] Assignee: The University of Iowa Research Foundation, Iowa City, Iowa

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,013

[22] Filed: Jul. 3, 1997

[51] Int. Cl.$^7$ ........................................................ G06F 9/44
[52] U.S. Cl. .................................................................. 717/11
[58] Field of Search ..................................... 395/701, 702, 395/703, 704, 705, 706; 717/11

[56] References Cited

U.S. PATENT DOCUMENTS

| | | | |
|---|---|---|---|
| 5,146,460 | 9/1992 | Ackerman et al. | 371/23 |
| 5,440,726 | 8/1995 | Fuchs et al. | 395/82.18 |
| 5,530,802 | 6/1996 | Fuchs et al. | 395/182.15 |
| 5,583,988 | 12/1996 | Crank et al. | 395/185.01 |
| 5,590,277 | 12/1996 | Fuchs et al. | 395/183.14 |
| 5,630,047 | 5/1997 | Wang | 395/182.13 |

OTHER PUBLICATIONS

Myer, J.F., "On Evaluating the Performability of Degradable Computing Systems," IEEE Transactions on Computers, 29(8), pp. 720–731, Aug. 1980.

Deconinck et al., "Survey of Checkpointing and Rollback Techniques," Technical Report 03.1.8 and 03.1.12, ESAT–ACAA Laboratory, Katholieke Universiteit, Leuven, Belgium, Jun. 1993.

Elnozahy, et al., "A Survey of Rollback–Recovery Protocols in Message–Passing Systems," Technical Report CMU–CS–96–181, School of Computer Science, Carnegie Mellon University.

Elnozahy et al., "The Performance of Consistent Checkpointing," IEEE Symposium on Reliable and Distributed Systems, pp. 39–47, Oct. 1992.

Li et al, "CATCH—Compiler–Assisted Techniques for Checkpointing," International on Fault Tolerant Computing, pp. 74–81, 1990.

Li et al., "Compiler Assisted for Checkpointing," Software–Practice and Experience, vol. 24, No. 10, Oct. 1994.

Franz M. Kaashoek, "Code Generation on the Fly: A Key to Portabel Software," Ph.D Thesis, Institute for Computer Systems, ECH Zurich, 1994.

J. Gosling, "The Java Language Environment," Technical Report, Sun Microsystems, Mountain View, California, 1995 (White Paper, http.//java.sun.com).

Theimer et al., "Heterogeneous Progress Migration by Recompilation," Proceedings of the 11$^{th}$ International Conference on Distributed Computing Systems, pp. 18–25, Jul. 1991.

(List continued on next page.)

Primary Examiner—Tariq R. Hafiz
Assistant Examiner—Todd Ingberg
Attorney, Agent, or Firm—Fleshner & Kim, LLP

[57] ABSTRACT

A method for portable checkpointing comprising the steps of: pre-compiling an input source code; and outputting an associated output source code which includes support for portable checkpointing. The portability of the checkpoints allows migration between systems with different hardware, software, and operating systems.

The portable checkpoints are stored in a Universal Code Format (UCF) and are selectively activated at the next potential checkpoint marker after a MinTBC (Minimum Time Between Checkpoints) timer expires.

51 Claims, 28 Drawing Sheets

OTHER PUBLICATIONS

Richards et al., "Blocking Entry Points in Message–Driven Parallel Systems," International Conference on Parallel Processing, Aug. 1995.

Zhou et al., "Heterogeneous Distributed Shared Memory," IEEE Transactions on Parallel and Distributed Systems, vol. 3, No. 5, pp. 540–554, Sep. 1992.

Writing Solid Code by Steve Maguire p. 77, May 1993.

Tutorial on LINT Cornell Theory Center, Jul. 1991.

Portable and Fault–Tolerant Software Systems, Volker Strumpen, 1998.

Gimpel Software Releases PC–LINT 5.0, Oct. 1991.

FlexeLint 6.0 for C/C++ cleans your code with a fine–toothed comb, Aug. 1995.

Picking Up Where lint Leaves Off—CodeCheck, C Portability Verifier Automate Inspections, Boosts Software Quality, 1991.

Computer Dictionary pp. 88, 373, Sep. 1997.

Silva et al., "Portable transparent checkpointing for distributed shared memory," Proc. of 5th IEEE Int. Symp. on High Perf. Dist. Comp., pp. 422–431, Aug. 9, 1996.

Silva et al., "Portable checkpointing and recovery," Proc. of 4th IEEE Int. Symp. on High Perf. Dist. Comp., pp. 188–195, Aug. 4, 1995.

Seligman et al., "High–Level Fault Tolerance in Distributed Programs," Technical Report CMU–CS–904–223, Carnegie Mellon University, Dec. 1994.

Plank et al., "Libckpt: Transparent Checkpointing Under Unix," Proc. of the Usenix Winter Conf., San Francisco, CA, Jan. 1995.

Elnozahy, et al., "The Performance of Consistent Checkpointing," IEEE Symposium on Reliable and Distributed Systems, pp. 39–47, Oct. 1992.

Li et al., "Compiler Assisted Full Checkpointing," Software–Practice and Experience, vol. 24, No. 10, Oct. 1994.

Beck et al., "Compiler–Assisted Checkpointing," Technical Report CS–94–269, University of TN, Dec. 1994.

```
typedef struct {              typedef struct {
  char    c ;                   char    c;
  double  d;                    int pad;
} cd_t;                         double d;
                              } cd_t;
```

FIG. 2

```
extern int checkpoint ( ) ;

main (int argc, char *argv[] ) {
 chkpt_main(argc, argv) ;
} chkpt_main(int argc, char *argv []) {
    int n, result;

n = atoi (argv [1]);
    result = fib (n);
} fib (int n) {
  if (n > 2)
      return (fib(n-1) + fib(n –2)) ;
  else {
    checkpoint ( ) ;
     return 1 ;
  }
}
```

FIG. 3

```
int fib (int n)
{
    unsigned long _SL_callid, _Sl_addr;
    int _SL_fun0, _SL_fun1 ;

switch (_SL_chkptmode) {
        case (_SL_EXEC) : break ;
        case (_SL_RESTORE) :
            _SL_addr = s_stack. top;
            _SL_RESTORE_fib_0 ;
            _SL_CONVERT_fib_0(_SL_addr) ;
            switch(_SL_callid) {
                case (0); goto L_SL_call0;
                case (1); goto L_SL_call1;
                case (2); goto L_SL_call2;
            }
        case (_SL_RECOVER) ;
            _SL_addr = s_stack.top ;
            _SL_CONVERT_fib_0 (_SL_addr) ;
            _SL_RESTORE_fib_0 ;
            switch (_SL_callid) {
                case (0) : goto L_SL_call0 ;
                case (1); goto L_SL_call1;
                case (2); goto L_SL_call2;

```
              .
              .
              .
        if (n > 2) {
          _SL_callid = 0 ;
L_SL_call0:
          _SL_fun0 = fib (n-1) ;
          switch (_SL_chkptmode) {
            case (_SL_EXEC) : break ;
            case (_SL_SAVE) : _SL_SAVE_fib_0;
                return 0;
          }

_SL_callid = 1;
L_SL_call1:
            _SL_fun1 = fib (n-2)
            switch (_SL_chkptmode) {
              case (_SL_EXEC) : break ;
              case (_SL_SAVE) : _SL_SAVE_fib_0;
                          return 0;
            }
            return_SL_fun0 + _SL_fun1;
        }
        else {
          _SL_callid = 2 ;
L_SL_call2:
            checkpoint ( ) ;
            switch (_SL_chkptmode ) {
              case (_SL_EXEC) : break ;
              case (_SL_SAVE) : _SL_SAVE_fib_0;
                              return 0;
            }
            return 1 ;
        }
      }
```

FIG. 5

```
#define _SL_SAVE_fib_0 { \
*- - ( (unsigned long * ) s_stack.top) = _SL_callid; \
*- - ( (int * ) s_stack.top) = n; \
*- - ( (int * ) s_stack.top) = _SL_fun0; \
*- - ( (int * ) s_stack.top) = _SL_fun1; \
} define _SL_RESTORE_fib_0 { \
_SL_fun1 = * ( (int * ) s_stack.top) ++; \
_SL_fun0 = * ( (int * ) s_stack.top) ++; \
n = * ( (int * ) s_stack.top)++; \
_SL_callid = * ( (unsigned long * ) s_stack.top)++; \
} static __ inline __ void _SL_CONVERT_fib_0(addr)
unsigned long addr;
{
_SL_conv_word(addr);      ( (int * ) addr)++;
_SL_conv_word(addr);      ( (int * ) addr)++;
_SL_conv_word(addr);      ( (int * ) addr)++;
_SL_conv_word(addr);      ( (unsigned long * ) addr)++;
}
```

FIG. 6

```
extern int checkpoint ( ) ;

chkpt_main ( )                    function1 (long *p)
{                                 {
   long  a [4];                       p += 1;
                                      checkpoint ( ) ;
   function1 (a) ;                    *p = 2;
}                                 }
```

FIG. 7

| System | plain [s] | instr. [s] | ovh [%] |
|---|---|---|---|
| HP 9000/705 /HPUX9.0 | 9.0 | 34.9 | 289 |
| HP 9000/715 /HPUX9.0 | 2.7 | 11.1 | 301 |
| i486DX475 / Linux | 20.0 | 38.0 | 90 |
| SPARCstation1+ / Sunos4.1 | 27.5 | 66.7 | 143 |
| SPARCstation20 / Sunos5.3 | 5.8 | 14.5 | 150 |

FIG. 17

| System | plain | instr | copy | local | NFS |
|---|---|---|---|---|---|
| i486/Linux | 0.71 | 1.09 | 2.26 | 6.54 | - |
| Sparc1+/4.1 | 0.59 | 1.78 | 2.43 | 5.78 | 21.76 |
| Sparc20/5.3 | 0.10 | 0.46 | 0.66 | 0.79 | 8.56 |

FIG. 18

|  | heat | matmult | prime |
|---:|---:|---:|---:|
| file | 1,061,208 | 4,546,420 | 10,836 |
| data/bss | 2,156 | 116 | 10,528 |
| heap | 1,058,884 | 4,546,148 | 20 |
| stack | 104 | 92 | 224 |

FIG. 19

| # of chkpts | UCCF compatible ||| UCCF incompatible |||
|---|---|---|---|---|---|---|
| | $t_{chkpt}$ | ovh | $t_{rec}$ | $t_{chkpt}$ | ovh | $t_{rec}$ |
| 0 | 196.1 | 7 | 196.1 | 196.1 | 7 | 196.1 |
| 1 | 198.0 | 8 | 201.3 | 198.0 | 8 | 202.6 |
| 3 | 200.4 | 9 | 207.2 | 201.9 | 10 | 209.5 |
| 6 | 205.2 | 12 | 215.0 | 207.8 | 13 | 220.5 |
| 12 | 213.0 | 16 | 231.6 | 218.7 | 19 | 240.7 |
| 24 | 228.9 | 25 | 262.3 | 240.5 | 31 | 282.7 |
| 47 | 262.9 | 44 | 331.6 | 285.2 | 56 | 374.1 |
| 91 | 342.2 | 77 | 453.2 | 363.0 | 98 | 539.0 |
| 168 | 430.3 | 135 | 684.4 | 505.3 | 176 | 846.5 |
| 1000 | 1662.5 | 807 | - | 1996.5 | 990 | - |
| runtime without instrumentation: 183.2s |||||||

| # of chkpts | UCCF compatible | | | UCCF incompatible | | |
|---|---|---|---|---|---|---|
| | $t_{chkpt}$ | ovh | $t_{rec}$ | $t_{chkpt}$ | ovh | $t_{rec}$ |
| 0 | 325.8 | 0 | 325.8 | 325.8 | 0 | 325.8 |
| 1 | 328.2 | 1 | 330.0 | 328.6 | 1 | 330.8 |
| 2 | 330.3 | 1 | 333.5 | 331.4 | 2 | 335.4 |
| 5 | 336.8 | 3 | 343.9 | 339.3 | 4 | 348.9 |
| 10 | 347.1 | 7 | 361.2 | 352.8 | 8 | 371.9 |
| 20 | 368.6 | 13 | 395.6 | 379.0 | 16 | 418.5 |
| 40 | 410.9 | 26 | 463.1 | 431.9 | 33 | 507.0 |
| 77 | 491.7 | 51 | 590.6 | 529.7 | 63 | 672.9 |
| 145 | 631.4 | 94 | 825.7 | 709.7 | 118 | 975.8 |
| 252 | 851.1 | 161 | 1201.6 | 1001.2 | 207 | 1460.8 |
| 1000 | 2441.6 | 649 | - | 2977.7 | 813 | - |
| runtime without instrumentation: 325.8s | | | | | | |

| # of chkpts | UCCF compatible | | | UCCF incompatible | | |
|---|---|---|---|---|---|---|
| | $t_{chkpt}$ | ovh | $t_{rec}$ | $t_{chkpt}$ | ovh | $t_{rec}$ |
| 0 | 62.1 | 0 | 62.1 | 62.1 | 0 | 62.1 |
| 1 | 62.3 | 1 | 62.7 | 62.5 | 1 | 62.8 |
| 3 | 62.6 | 1 | 63.7 | 62.7 | 1 | 64.1 |
| 7 | 62.9 | 2 | 65.8 | 63.4 | 3 | 66.7 |
| 15 | 63.8 | 3 | 69.9 | 64.9 | 5 | 71.9 |
| 30 | 65.6 | 6 | 77.6 | 67.5 | 9 | 81.5 |
| 59 | 68.8 | 11 | 92.5 | 72.7 | 18 | 100.2 |
| 1000 | 173.7 | 181 | - | 241.0 | 290 | - |
| runtime without instrumentation: 61.8s | | | | | | |

| System | MinTBC [s] | # of chkpts | without storing checkpoint to disk | | | | without storing checkpoint to local disk | | | |
|---|---|---|---|---|---|---|---|---|---|---|
| | | | UCF compatible | | UCF incompatible | | UCF compatible | | UCF incompatible | |
| | | | time | ovh | time | ovh | time | ovh | time | ovh |
| i486/ Linux (179.4s) | 32 | 5 | 456.2 | 154 | 443.0 | 147 | 565.5 | 215 | 566.5 | 216 |
| | 64 | 2 | 272.6 | 52 | 274.1 | 53 | 328.4 | 83 | 331.5 | 85 |
| | 128 | 1 | 215.0 | 20 | 218.5 | 22 | 235.1 | 31 | 235.4 | 31 |
| | 256 | 0 | 180.5 | 1 | 181.7 | 1 | 181.5 | 1 | 183.3 | 2 |
| Sparc1+/ Sunos4.1 (300.3s) | 32 | 9 | 314.7 | 5 | 332.6 | 11 | 382.7 | 27 | 412.4 | 37 |
| | 64 | 4 | 307.8 | 2 | 317.1 | 6 | 353.9 | 18 | 356.1 | 19 |
| | 128 | 2 | 306.0 | 2 | 311.5 | 4 | 330.2 | 10 | 340.5 | 13 |
| | 256 | 1 | 304.5 | 1 | 307.6 | 2 | 319.7 | 6 | 323.6 | 8 |
| | 512 | 0 | 302.9 | 1 | 303.8 | 1 | 303.3 | 1 | 302.6 | 1 |

| System | MinTBC [s] | # of chkpts | storing checkpoint to local disk | | | | storing checkpoint via NFS | | | |
|---|---|---|---|---|---|---|---|---|---|---|
| | | | UCF compatible | | UCF incompatible | | UCF compatible | | UCF incompatible | |
| | | | time | ovh | time | ovh | time | ovh | time | ovh |
| Sparc20/ Sunos5.3 (62.8s) | 0 | 615 | 351.5 | 460 | 562.9 | 796 | - | - | - | - |
| | 1 | 61 | 91.5 | 46 | 112.0 | 78 | 1313.8 | 1992 | 1203.6 | 1817 |
| | 2 | 30 | 77.0 | 23 | 80.1 | 42 | 719.2 | 1045 | 632.3 | 907 |
| | 4 | 15 | 70.1 | 12 | 75.1 | 20 | 328.7 | 423 | 327.9 | 422 |
| | 8 | 7 | 67.6 | 8 | 68.7 | 9 | 185.7 | 196 | 202.3 | 222 |
| | 16 | 3 | 64.5 | 3 | 65.9 | 4 | 115.4 | 84 | 119.2 | 90 |
| | 32 | 1 | 63.5 | 1 | 63.8 | 2 | 79.6 | 27 | 79.1 | 26 |
| | 64 | 0 | 62.8 | 0 | 62.8 | 0 | 62.8 | 0 | 62.8 | 0 |

FIG. 21

| MinTBC [s] | i486/Linux | | | Sparc1+/Sunos4.1 | | | Sparc20/Sunos5.3 | | |
|---|---|---|---|---|---|---|---|---|---|
| | # of chkpts | time [s] | ovh [%] | # of chkpts | time [s] | ovh [%] | # of chkpts | time [s] | ovh [%] |
| 0 | 256 | 48.8 | 87 | 256 | 294.9 | 18 | 256 | 83.6 | 1.3 |
| 1 | 24 | 28.6 | 10 | 188 | 282.7 | 13 | 69 | 82.8 | 0.4 |
| 2 | 12 | 27.4 | 5 | 101 | 267.9 | 7 | 37 | 82.7 | 0.2 |
| 4 | 6 | 26.9 | 3 | 55 | 260.1 | 4 | 19 | 82.6 | 0.1 |
| 8 | 3 | 26.6 | 2 | 29 | 255.6 | 2 | 10 | 82.6 | 0.1 |
| 16 | 1 | 26.4 | 1 | 15 | 253.3 | 1 | 5 | 82.5 | 0.0 |
| 32 | 0 | 26.3 | 1 | 7 | 251.9 | 1 | 2 | 82.5 | 0.0 |
| 64 | | | | 3 | 251.1 | 0 | 1 | 82.5 | 0.0 |
| 128 | | | | 1 | 250.7 | 0 | 0 | 82.5 | 0.0 |
| 256 | | | | 0 | 250.5 | 0 | | | |
| plain | - | 26.1 | - | - | 250.5 | - | - | 82.5 | - |

FIG. 22

SYSTEM AND METHOD FOR PROVIDING CHECKPOINTING WITH PRECOMPILE DIRECTIVES AND SUPPORTING SOFTWARE TO PRODUCE CHECKPOINTS, INDEPENDENT OF ENVIRONMENT CONSTRAINTS

BACKGROUND OF THE INVENTION

1. Field of the Invention

This invention relates generally to a method and apparatus for portable checkpointing and specifically to a method and apparatus for pre-compiling user software, written in a general-purpose programming language, to enable portable checkpoints in a Universal Checkpoint Format (UCF). Some of the concepts related to this invention are disclosed in the following two reports by the inventors: Volker Strumpen, Balkrishna Ramkumar, *Portable Checkpointing and Recovery in Heterogeneous Environments*, Dept. of Electrical and Computer Engineering, University of Iowa, Technical Report No. 96-61-1, June 1996 and B. Ramkumar and V. Strumpen, *Portable Checkpointing for Heterogeneous Architectures*, Proceedings of the 27th Fault-Tolerant Computing Symposium, Jun. 25–27, 1997. Both of these reports are incorporated herein by reference.

2. Background of the Related Art

As Internetworking matures, worldwide distributed computing will become more prevalent. Simple probabilistic analysis suggests that such large geographically distributed systems will exhibit a high probability of single failures, even if each individual component is quite reliable. Due to the difficulties associated with programming such systems today, local area networks (LANs) are still used heavily for long running simulations. Even on such systems, failures occur frequently due to a variety of reasons including network failures, process failures, and even administration downtime. Thus, fault tolerance is fast becoming an essential feature for networked programming systems.

Large distributed systems are inherently heterogenous in nature. Even LANs today often consist of a mixture of binary incompatible hardware components and operate with an even larger variety of operating systems, or different versions of the same operating system. Providing fault tolerance in such environments is a key technical challenge, especially since it requires that checkpointing and recovery be portable across the constituent architectures and operating systems.

A checkpoint is the state of a computation, saved partway through its execution. A checkpoint can be restored and the computation can be recovered from that state. Portable checkpoints are machine independent checkpoints based on the automatic generation of checkpointing and recovery code.

The subject of checkpoints has been investigated by several researchers, especially in the field of fault tolerance. Unfortunately, no one has been able to develop the technology (software of otherwise) that provides for machine independent state generation and restoration for general-purpose programming languages.

In the present invention, a user software program is pre-compiled with a source-to-source pre-compiler before a native compiler generates the machine dependent object code. This object code may now generate portable checkpoints of the program state on a stable storage medium at a desired frequency. The checkpoint can be recovered on a binary incompatible machine, possibly with a different processor and operating system.

Some application areas of this technology are support of fault tolerance in heterogeneous computer networks, migrating process to binary compatible machines for load balancing or load redistribution, suspension of execution of a program for subsequent execution at a later time on a possibly different configuration of machines, or retrospective diagnostics and debugging.

This method provides a cheap and cost-effective solution to computationally intensive problems where dependability is critical, either because a quick response time is essential, or because failures result in higher operation costs, important application areas include e.g., air-traffic control, battle-field virtual realty simulation, hardware design, and VLSI design and test. Current technology requires companies (e.g., IBM, Intel, Boeing) to invest heavily in replicated hardware, or spend substantial effort and time running long and complex simulations to identify and debug flaws and potential weaknesses in their product designs.

The problem of reliability in computing systems has been studied in many different forms. The evaluation of the performability of degradable computing systems was first addressed in a seminal paper by Myer, J. F. On evaluating the performability of degradable computing systems, *IEEE Transactions on Computers*, 29(8):720–731, August 1980.

Reliable computing has also received attention in the context of parallel and distributed systems, ranging from hardware and/or interconnection network-specific solutions, language specific solutions, algorithm-specific solutions to application-specific solutions. A good survey of checkpointing and rollback techniques can be found in: (1) Deconinck, G. Vounckx J., Cuyvers R., Lauwereins R., Survey of Checkpointing and Rollback Techniques. Technical Report 03.1.8 and 03.1.12, ESAT-ACAA Laboratory, Katholieke Universiteit, Leuven, Belgium, June 1993 and (2) Elnozahy E. N., Johnson D. B., Wang Y. M. A Survey of Rollback-Recovery Protocols in Message-Passing Systems. *Computing Surveys*, 1996. (submitted), Also Technical Report CMU-CS-96-181, School of Computer Science, Carnegie Mellon University.

There has also been work in optimizing the checkpointing and recovery process. Beck M., Plank J. S., Kingsley G. Compiler-assisted checkpointing. Technical Report CS-94-269, University of Tennessee, December 1994. submitted to FTCS 95. Beck et al classify checkpointing optimizations into two categories: latency hiding optimizations and memory exclusion optimizations. Latency hiding optimizations make a copy of the checkpoint in main memory and overlap the task of writing the checkpoint to stable storage with useful computation. Compression algorithms have been used to reduce the amount of data to be checkpointed, although it has been shown that compression is only beneficial in systems exhibiting contention for secondary storage.

Memory exclusion optimizations include incremental checkpointing, compiler-assistance to reduce the frequency and volume of checkpoints, and user-directed checkpointing. The use of hardware support to identify memory pages that have changed since the last checkpoint has been proposed (Elnozahy E. N., Johnson D. B., Zwacnepoel W. The performance of consistent checkpointing. *IEEE Symposium on Reliable and Distributed Systems*, pages 39–47, October 1992). These pages are then copied to secondary storage using copy-on-write while program execution continues. While yielding very low checkpointing overhead, a primary disadvantage of this method is that is restricted to binary compatible hardware and operating systems.

The use of compilers to assist in the checkpointing process was first proposed by Li and Fuchs (Li C-C. J., Fuchs W. K. CATCH—Compiler-assisted Techniques for Checkpointing. In *International Symposium on Fault Tolerant Computing*, pages 74–81, 1990 and Li C-C J., Stewart E. M., Fuchs W. K. Compiler Assisted Full Checkpointing. *Software-Practice and Experience*, 24 no. 10:871-8861, October 1994), where the compiler identifies points in the program where checkpoints may potentially be taken, the heuristics are used to determine which of these checkpoints will be activated. Beck et al propose extensions to the transparent libckpt library for automatic uniprocessor checkpointing. They support compiler directives that may be provided by the programmer (or a static analyzer) to optimize the frequency of checkpointing and the amount of information that needs to be checkpointed, by identifying memory that can be excluded from being checkpointed. This work does not address portability.

Elnozahy et al (Elnozahy E. N., Johnson D. B., Zwaenepoel W. The performance of consistent checkpointing. In *IEEE Symposium on Reliable and Distributed Systems*, pages 39–47, October 1992) and Plank et al (Plank J. S., Beck M., Kingsley G., Li K. Libckpt: Transparent Checkpointing under Unix. In *Proceedings of the Usenix Winter Technical Conference*, San Francisco, Calif., January 1995) have proposed efficient implementation techniques to minimize the overhead of checkpointing to few percent of the execution time, The techniques developed in these references rely on efficient page-based bulk copying and hardware support to identify memory pages modified since the last checkpoint, Unfortunately, these optimizations are restricted to binary compatible hardware and operating systems.

The issue of portability across heterogeneous architectures has been addressed in the language community (Franz M. Kaashoek Code generation on the Fly: A Key to Portable Software. PhD thesis, Institute for Computer Systems, ETH Zurich, 1994 and Gosling J. The Java Language Environment. Technical Report, Sun Microsystems, Mountain View, Calif., 1995. white paper. Languages like Java provide an interpreter-based approach to portability where the program byte code is first "migrated" to the client platform for local interpretation. Unfortunately, such methods severely compromise performance since they run at least an order of magnitude slower than comparable C programs. Another possibility is "compilation on the fly" which provide portability by compiling the source code on the desired target machine immediately prior to execution. This technique requires the construction of a complex language environment. Moreover, to date neither interpreter-based systems nor compilation on the fly are explicitly designed to support fault tolerance.

The idea of stack mobility has been explored by researchers in a limited context. Theimer and Hayes (Theimer M. M., Hayes B. Heterogeneous Process Migration by Recompilation. In *Proceedings of the 11th International Conference on Distributed Computing Systems*, pages 18–25, July 1991) present a recompilation-based approach to heterogeneous process migration. Their compilation technique is to, upon migration, translate the state of a program into a machine independent state. Then, a migration program is generated that represents the state, and can be compiled on a target machine. When run, the machine independent migration program recreates the process. Rather than compiling a migration program each time that a checkpoint is to be taken, the present method instruments the original program with code that barely affects the runtime during normal execution. This avoids the overhead of compiling a migration program and is conceptually much simpler. However, several assumptions are made, including one that "the state of a program at any migration point is sufficiently well-specified to allow its complete translation between machine-dependent and machine-independent forms." What constitutes a migration point, and how this program state is identified and translated are not discussed.

Richards and Ramkumar (Richards, R. J., Ramkumar B. Blocking Entry Points in Message-Driven Parallel Systems. In *International Conference on Parallel Processing*, August 1995) report the transformations needed to support runtime stack mobility for small tasks in a portable parallel language called ELMO. The technique relied on explicit programmer support for marshaling and unmarshalling complex data structures. The transformations were developed for task migration in portable parallel programming environments for homogeneous networks and did not discuss fault tolerance or checkpointing.

Zhou et al (Zhou S., Stumm M., Li K., Wortman D. Heterogeneous Distributed Shared Memory. *IEEE Transactions on Parallel and Distributed Systems*, 3 no. 5:540–554, September 1992) describe the Mermaid system for distributed shared memory on heterogeneous systems. This system is not fault tolerant, but generates data representation conversion routines automatically for all shared memory objects. This paper provides a detailed treatment on conversion. A major difference from the present invention is the conversion code generation for complex data types. Whereas Mermaid uses "utility software" to generate this code, the present invention utilizes the information provided by the abstract syntax tree to this end. Another design decision of Mermaid is the dedication of a page of memory to a particular data type. Although the authors defend this method in the context of dynamically allocated shared memory, such an organization is clearly impractical for the runtime stack, which has to be converted too when saving a checkpoint. Moreover, the poor data locality caused by this data organization is likely to result in a significant loss in performance.

Seligman and Beguelin (Seligman E., Beguelin A. High-Level Fault Tolerance in Distributed Programs. Technical Report CMU-CS-904-223, Carnegie Mellon University, December 1994) have developed checkpointing and restart methods in the context of the Dome C++ environment. Dome provides checkpointing at multiple levels, ranging from high level user-directed checkpointing that sacrifices transparency for portability and low overhead, to low level checkpointing that is transparent but results in non-portable code and requires larger checkpoints. Dome's checkpointing is designed for portability, but requires that the program be written in the form of a main loop that computes and checkpoints alternately. This obviates the need to store the runtime stack. Our approach, on the other hand, provides a general mechanism to save the runtime stack.

In contrast to these other methods, our invention presents a novel method and apparatus for portable checkpointing in heterogeneous network environments. Programs can be checkpointed on one machine running UNIX, and transparently recovered on a machine with different byte-ordering and data-alignments. The present invention provides a new, efficient portable checkpointing and recovery mechanism that provides both portable program execution as well as fault tolerance in heterogeneous environments.

The above references are incorporated by reference herein where appropriate for appropriate teachings of additional or alternative details, features and/or technical background.

SUMMARY OF THE INVENTION

The present invention provides a method of portable checkpointing in which a source-to-sourcepre-compiler is used to pre-compile the source code of a user program into a semantically equivalent program with the additional functionality to save and recover from portable checkpoints.

The method and apparatus according to the present invention, called shadow checkpointing, uses extensive compiler and run-time support to provide migratable checkpoints and heterogeneous recovery across all UNIX-based workstations and personal computers. It is demonstrated, through appropriate testing, that shadow checkpoints are robust across architecture, operating system as well as compiler variations across target platforms. Furthermore, the overhead of providing shadow checkpointing is very low making it both viable and practical.

Most of the results presented in relation to the present invention relate to C programs, although this idea can be extended to other programming languages such as C++, Java, and Fortran. The flexibility afforded by pointers provides the real technical challenge when supporting portable checkpointing. It is assumed that any program under consideration for shadow checkpointing has been written in a portable manner. In other words, it is assumed that the program can be compiled and executed to yield the desired result on any of the heterogeneous platforms under consideration without modification.

An object of the present invention is to provide a method for machine independent (e.g., PCs, Workstations, etc) generation and restoration of checkpoints for general-purpose programming languages (e.g., C, C++, Fortran).

An additional object of the present invention is to provide a Universal Checkpoint Format (UCF) which can be optimized for particular computing platforms and operating systems.

Another object of the present invention is to provide a method for portable checkpointing which is transparent to the programmer and which can be applied to legacy code for which source code is available.

An additional object of the present invention is to provide a method for portable checkpointing having low runtime overhead and low memory and disk overhead.

An advantage of the present invention is that the method provides fault tolerance in heterogeneous computer networks.

An additional advantage of the present invention is that it provides a cost effective solution to computationally intensive problems in which dependability is critical.

Another advantage of the present invention is that it allows the migration of processes to binary incompatible machines for load balancing or load redistribution, suspension of execution of a program for subsequent execution at a later time on a possibly different configuration of machines, or retrospective diagnostics and debugging.

A feature of the present invention is a Universal Checkpoint Format (UCF) which can be optimized for particular computing platforms and operating systems.

An additional feature of the present invention is the applicability of the method to any general-purpose programming language.

Another feature of the present invention is heterogeneous recovery that makes it possible to write a checkpoint on one architecture, and read it during recovery on a possibly different architecture.

These and other objects, advantages, and features can be accomplished in accordance with the present invention by provision of a method for portable checkpointing comprising the steps of: pre-compiling an input source code; and outputting an associated output source code which includes support for portable checkpointing.

Additional objects, advantages, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 shows UCF padding of source code according to an embodiment of the invention.

FIG. 3 shows a recursive program, fib, to compute Fibonacci numbers according to an embodiment of the invention.

FIG. 4 shows the jump table generated at the entry of function fib according to an embodiment of the invention.

FIG. 5 shows the function call wrappers generated in the body of function fib according to an embodiment of the invention.

FIG. 6 shows compiler generated code for saving, restoring, and converting the variables in function fib according to an embodiment of the invention.

FIG. 7 shows a code fragment illustrating the shadow checkpointing method, according to one embodiment of the invention, with call by reference.

FIG. 17 shows the overhead of code instrumentation for fib, according to an embodiment of the invention.

FIG. 18 shows the runtimes of different systems without checkpoint instrumentation (plain), with instrumentation but without storing a single checkpoint (instr), saving one checkpoint specified by using an appropriate timer value-on the shadow stack without writing it to disk (copy), saving one checkpoint on the shadow stack and writing it to a local disk (local) and via NFS to a remote disk (NFS), according to an embodiment of the invention.

FIG. 19 shows checkpoint sizes and break-downs for example applications, according to an embodiment of the invention.

FIG. 21 summarizes the runtimes and overheads for the checkpointed dense matrix-matrix multiplications of two dense 615×615 matrices without failures, according to an embodiment of the invention.

FIG. 22 shows the results of running prime without failures on the first 10,000,000 natural numbers with a grain size of 250, according to an embodiment of the invention.

DETAILED DESCRIPTION OF PREFERRED EMBODIMENTS

Figure 1:
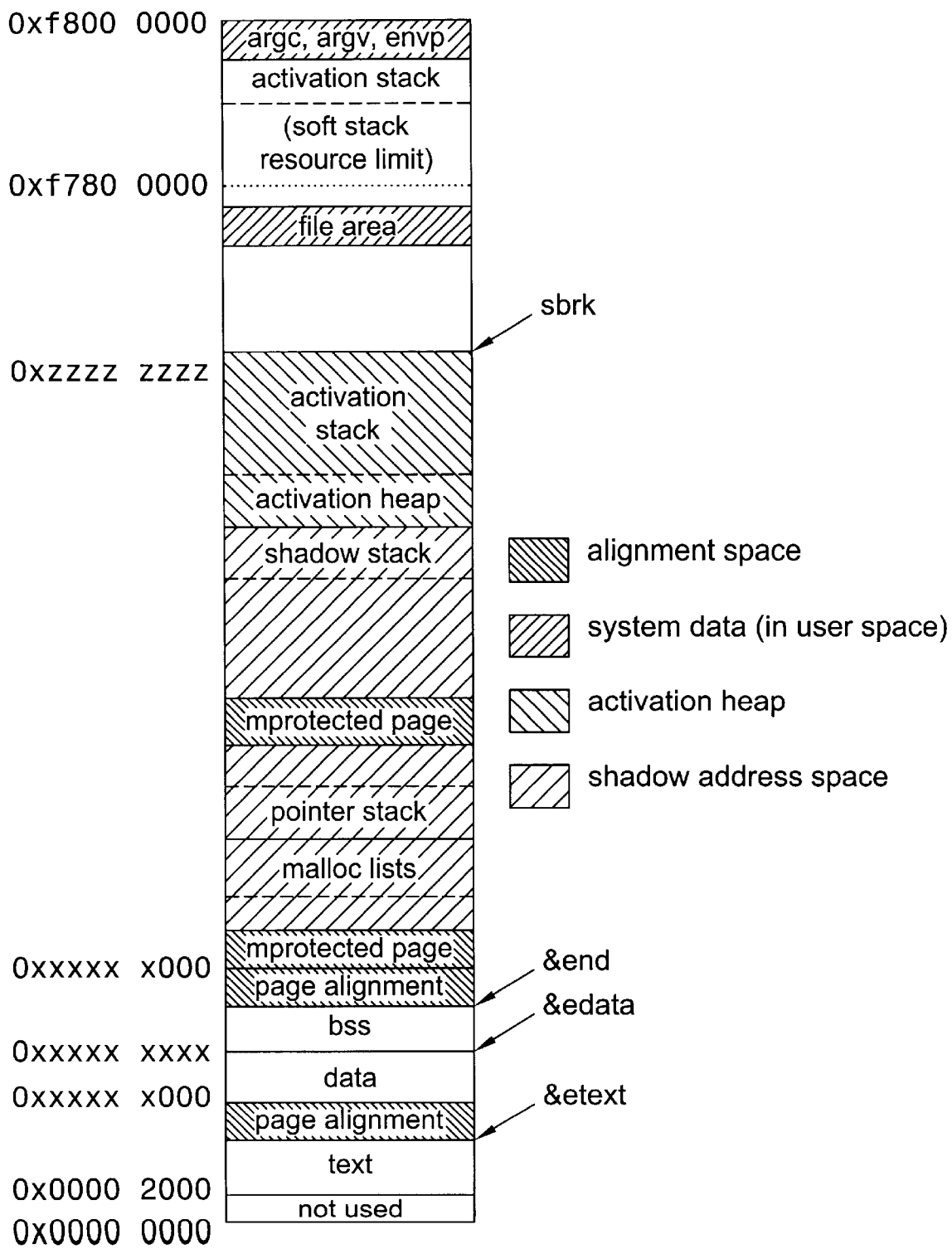
FIG. 1 shows an example of the organization of a typical shadow address space according to an embodiment of the invention.

Recent advances in networking and architecture design are making workstations and personal computers omnipresent. The arrival of the next generation of personal workstations will only serve to increase this trend. Their low cost and easy availability make workstation networks scalable and, in all likelihood, the parallel processing systems of the future.

A direct consequence of this wide availability and use is the wide variation in computing environments in use today. Such networks are typically heterogeneous and support a variety of processor and operating system configurations. Moreover, it is possible to find two or more workstations on a network with identical hardware configurations running different operating systems or different versions of the same operating system. Finally, each workstation typically presents the programmer/user with a choice of compilers, which are typically incompatible with each other. Compilers impose their own differences during the creation of stack frames, handling of procedure calls, etc.. On machines that are not binary compatible, programs need to be compiled separately for different machines, and no assumptions can be made about compiler compatibility during checkpointing and recovery.

This diversity in platforms makes it very difficult to recover from failure on one machine on a different machine on the network. Providing fault tolerance in such environments presents two key challenges: (a) migratable checkpoints: a universal checkpoint format (UCF) that is generated and recognized by every architecture, and (b) heterogeneous recovery that makes it possible to write a checkpoint on one architecture, and read it during recovery on a possibly different architecture. This problem is broadly defined as portable checkpointing.

Besides fault tolerance, portable checkpointing also provides portable program execution together with the ability to migrate processes across the different platforms during program execution. This also allows for the interesting possibility of running each phase of a multi-phase computation on the machine best suited to it.

Checkpointing Properties

For a checkpointing method to be commercially viable, it must exhibit the following properties:

Transparency

The programmer should not need to do more than use a different compiler and link in a library with the application object code in order to render the executable code fault tolerant. The pre-compiler should also be able to analyze and insert checkpoint requests at suitable points in the user code. Since users frequently run legacy codes, it is not reasonable to require them to specify where in the code checkpoints must be taken. The runtime system will use a timer to selectively exercise pre-compiler-generated checkpoint requests. This yields some interesting tradeoffs between the frequency of checkpointing and the mean time between failures (MTBF) on the target machine.

Portability

Checkpoints must be portable. Sometimes, it is necessary or desirable to recover a failed or interrupted computation on a different processor architecture. Upon failure, it is not reasonable to assume a binary compatible processor using the same operating system is always available.

Runtime Overhead

The overhead due to checkpointing must be minimized. If the overhead is unacceptably high, it may be more efficient to avoid checkpointing and simply rerun the application in the event of failure, The overhead on the overall execution time must be kept very low. The overhead will depend on the volume of data that will need to be checkpointed.

Memory Overhead

The size of checkpoints must be minimal. On real systems, the available memory and disk space may affect both the ability to checkpoint, as well as the performance of checkpointing (due to increased swapping). The available memory may even limit the problem size of the program.

Portability Obstacles

In order to make checkpoints portable across different architecture-operating system configurations, it is necessary to identify and overcome several hurdles. The primary obstacles to portable checkpointing are as follows:

Architecture

The primary obstacle for portability is the variety of representation and sizes of basic data types and the data layout in memory.

Data Representation

Although most recent architectures support the IEEE floating point standard 754, there is no agreement about implementing little endian and big endian memory addressing. Furthermore, the number of bits invested into the representation of basic data types varies, and is currently changing with the introduction of 64-bit architectures.

Alignment

Different memory architectures require different alignments. Since compiler writers tend to optimize space efficiency, alignment computations optimize the underlying memory, architecture to a certain extent. As a consequence, data objects can have different sizes on different architectures if the data representations are identical.

Hardware Support of Efficient Compilation

The number of registers available and related hardware support plays an important role in the organization of the runtime stack. On Sun workstations, the presence of register windows leads to a very different stack frame layout when compared to, for example, an HP workstation. As a result, the runtime stack layout varies from architecture to architecture.

UNIX (Operating System) Implementation

Differences among UNIX implementations (BSD/System V) complicate checkpoint portability.

Address Space

The address space, or memory layout, of a UNIX process is not portable. Besides the fact that different page sizes are used, the quasi-standard address space places the text and data/bss segments at the bottom and grows the heap segment upwards above these segments. The stack grows downwards from the address space. The HPUX operating system, on the other hand, divides the address space into four quadrants, places the text segment into the first quadrant, data/bss and heap into the second, and grows the stack upwards starting near the middle of the second quadrant. Page-based checkpointing cannot provide portability across different address space layouts.

System Calls

Different UNIX systems may provide access to the same functionality by means of different names (getpagesize/sysconf) or provide system calls with the same name but different functionalities (mprotect). Whereas some operating systems allow for protecting any page of a process's virtual address space at user-level, some only provide this feature for memory-mapped areas. The later ones do not facilitate the implementation of page-based checkpointing methods.

Language Features

Certain programming language features yield runtime behavior that is not portable.

Pointers into a process's address space are in general not portable when considering different architectures or different address space layouts.

Dynamic memory management is system specific, due to differences in allocation methods.

Shadow Checkpointing

As discussed earlier, it is desirable to transparently checkpoint a program at periodic intervals. The interval can be determined as a function of:

The mean time between Failures (MTBF). Assuming that the application is not responsible for the failure, for an application to converge toward successful completion, it is necessary that checkpointing frequency be higher than the expected failure frequency. The recomputation required. The more frequently a program is checkpointed, the less the amount of computation loss. The computation loss is defined as the amount of the computation between the last checkpoint and the point of failure. It is important that this recomputation be reported as part of the cost of recovery. The size of the program data that needs to be checkpointed. If the checkpoints are very large, it is clearly desirable to checkpoint as infrequently as possible.

The design trade-offs in checkpoint and recovery methods involve both system and program properties. In particular, the mean time between failure (MTBF) can be viewed as a system property, assuming that the failure is not caused by the application program. On the other hand checkpoint size is primarily dependent on the program, and the points in the program execution where the checkpoint is taken. Therefore, the method distinguishes potential checkpoint locations of a program from checkpoints that are actually stored. Potential checkpoint locations are program specific and may be chosen by a pre-compiler or user in order to minimize checkpoint size. The optimal frequency of checkpointing depends on the underlying system's MTBF. Assuming that potential checkpoint locations are reached relatively often during MTBF, the minimum time between checkpoints (MinTBC) can be optimized based on the system's MTBF.

In general, at compile time it is not possible to determine the ideal location for each checkpoint. However, a pre-compiler may be able to determine good potential checkpoint locations with a view to minimize the checkpoint size. At run time, an optimal checkpointing frequency can be computed and used to selectively exercise some of these checkpoints in the event that the potential checkpoints are encountered relatively frequently.

In accordance with one embodiment of the invention, a portable checkpointing method provides (1) a mechanism to mark potential checkpoint locations, (2) timer-based control for selective activation of checkpoints. The first potential checkpoint marker encountered after the timer has expired is selectively activated. The timer is then reset following completion of the checkpoint.

In accordance with another embodiment of the invention, a source-to-source pre-compiler, c2ftc, translates C programs into fault tolerant C programs. This pre-compiler generates code for saving and recovering portable checkpoints to enable fault tolerance across heterogeneous architectures. The c2ftc pre-compiler instruments the source program based on potential checkpoint locations in the program specified by the programmer.

In a further embodiment, the pre-compiler automatically inserts checkpoint requests at pre-compile time. c2ftc maintains checkpoints in a Universal Checkpoint Format (UCF), a machine independent format which is customizable for any given configuration of heterogeneous machines by specifying basic data types including byte order, size, and alignment. Other representation issues such as the encoding of denormalized numbers can be handled by supplying architecture specific conversion routines. Once generated, these checkpoints can be restored on binary incompatible architectures.

The c2ftc pre-compiler represents an approach to portable checkpointing based on source-to-source pre-compilation. This approach represents an elegant solution to three key problems:

Preservation of Program Semantics

Source-to-source transformations guarantee that program semantics remain invariant, because they are target independent.

Availability of Type Information of Program Data During Checkpointing

In order to generate conversion code, type information for all variables declared in the program must be available.

Portable Runtime Support

The approach permits the choice of fault tolerance transformations that do not expose architecture dependencies, thereby enabling portable runtime support.

Source-code level transformations, i.e. pre-compiling the original source code, can provide portability, where system-based approaches would become very complex or even fail. For example, in order to capture the state of the stack at the system level, not only do program counter, stack pointer, and other architecture specific states need to be saved, knowledge of compiler-specific behavior is also necessary. The stack frame layout must be known in order to associate type information with corresponding memory locations to effect conversion of data representations. Some compilers do not reserve stack space for variables stored in registers. In such cases, a system-based approach would also have to provide support for saving and restoring register contents across machines with potentially different register sets. It is unclear how portability could be provided in such situations.

Moreover, source-to-source pre-compilation provides opportunities for additional optimizations that cannot be exploited by system-based methods such as:

1) It is possible to perform live variable analysis at pre-compile time and reduce the amount of data that needs to be checkpointed.
2) Pre-compile-time analysis can be used to identify potential checkpoint locations in a program to reduce checkpointing overhead.
3) Pre-compile-time analysis can be used to support garbage collection of the heap at run time before checkpoints are taken.

c2ftc applies transformations for fault tolerance to the abstract syntax tree of a C program. These transformations involve analysis, minor changes to the source code such as moving function calls out of expressions, and adding new code to effect portable checkpoints at the application level.

In the current embodiment, the user must specify potential checkpoint locations by inserting a call to the library function checkpoint. The frequency of checkpointing is controlled using a timer that activates checkpointing when the next potential checkpoint location is visited. Then, the state of the program is pushed onto the shadow stack, which is subsequently saved on stable storage. The shadow stack is maintained in the Universal Checkpoint Format (UCF). On UCF-incompatible machines, data are converted on-the-fly while pushing the state onto the shadow stack, and vice versa during recovery. The code for pushing and popping variables from the shadow stack as well as for conversion is pre-compiler generated.

Portability Structures

The following structures, shadow address space and Universal Checkpoint Format (UCF), are presented to support portable checkpoints, according to one embodiment of the invention:

1. Shadow address space is user-level partitioning of a process's virtual address space. Its functions are to (1) reserve memory for the shadow stack, which can be viewed as a marshaling buffer for the checkpoint, (2) support user-level heap allocation to simplify pointer resolution, and (3) provide performance optimization by using interrupts to handle shadow stack overflows.

FIG. 1 shows an example of the organization of a typical shadow address space. At the bottom are the text, data and bss segments, whereas the stack is aligned to the top of the address space. The heap area is used to allocate a sufficient amount of memory that holds the activation heap, the shadow stack and the data structures needed for managing memory and checkpointing. These include the pointer stack, explained below, and the malloc lists of our user-level memory management of the activation heap. To distinguish the runtime stack from the shadow stack, it is called activation stack in the following. The shadow stack is the central data structure for checkpointing. All variables defining the state of the program at the time of checkpointing are pushed onto the shadow stack. Eventually, the shadow stack holds the checkpoint in a contiguous area of memory, that can be transferred to stable storage.

The pointer stack and malloc lists are dynamic data structures. Write protected virtual memory pages are used to handle overflows efficiently. On systems that do not allow for write protecting virtual memory pages at user-level, overflow checks need to be included in the shadow stack and memory allocation operations.

Malloc lists are managed by a heap memory management method that maintains more information about a heap object than the operating system is necessary for checkpointing and recovering pointers. During program translation, functions are generated to explicitly save, convert and restore data in each stack frame, each dynamically allocated data type, and global data in the program. References to these functions are associated with each allocated memory block.

An important reason for introducing the shadow stack has been the fact that transferring a large checkpoint via a network is the most time consuming portion of checkpointing. Once the checkpoint is available on the shadow stack, communication latency hiding can be used to transfer the checkpoint and continue the computation at the same time.

The shadow address space is a user-level partitioning of a process's virtual address space. Its functions are to: (1) reserve memory for the shadow stack, which can be viewed as a marshaling buffer for the checkpoint, (2) support user-level heap allocation to permit efficient pointer resolution, and (3) provide performance optimization by using interrupts to handle shadow stack overflows.

The shadow stack is the central data structure for checkpointing. All variables defining the state of the program (e.g., global, dynamically allocated and automatic stack variables) at the time of checkpointing are systematically pushed onto the shadow stack. During the checkpointing process, pointer variables are translated into offsets to render them portable. During recovery, the offsets are replaced by the references to the original target. Eventually, the shadow stack holds the checkpoint in a contiguous area of memory, that can be transferred to stable storage.

The shadow stack essentially doubles the memory requirement of an application. One of several options to service memory, if the DRAM cannot hold the shadow stack, is to memory-map the shadow stack to local disk, trading checkpointing overhead for memory requirement. This will still be substantially faster than transferring a large checkpoint via a network which is the most time-consuming portion of checkpointing to date. Once the checkpoint is available on the shadow stack, copy-on-write methods or communication latency hiding, as disclosed in Strumpen V. Software-Based Communication Latency Hiding for Commodity Networks. In *International Conference on Parallel Processing*, August 1996, which is incorporated herein by reference, may be used to efficiently transfer the checkpoint and continue the computation at the same time.

2. Universal Checkpoint Format (UCF) specifies the layout of a portable checkpoint, such as header information and data segments, as well as the data representations and alignments used in the checkpoint. UCF data representations and alignments can be specified by the user. As such, UCF is an adaptable format that can be customized to particular networks. For example, data representations and alignments of the majority of available machines in the network can be chosen. Since UCF-incompatible systems have to convert data types, UCF-incompatible systems pay a runtime penalty. The concept of UCF for portable checkpoints is similar to, but more flexible than, the external data representation (XDR) for remote procedure calls.

UCF is a flexible and adaptable format that can be customized to a particular network by specifying byte order, size and alignment of basic types, as well as complex data representations such as denormalized numbers. Typically, data representations and alignments of the majority of available machines in the network should be chosen as the UCF format to minimize the overhead of converting data types to and from the UCF format on UCF-incompatible systems. In evolving networks, the UCF format can be changed as frequently as necessary; this only requires that programs requiring checkpointing be recompiled before execution.

Alignment incompatibilities pose special problems on portability. Consider the example in FIG. 2. The size of structure cd_t on the left, depends on the data representations and alignment. For example, on both i486/Linux system and Sparc/SunOS system, a char consumes 1 byte and a double 8 bytes. However, on the former system, a double is 4 byte aligned leading to a structure size of 12 bytes, whereas a double on the later system is 8 byte aligned, yielding a structure size of 16 bytes. To cope with such alignment incompatibilities, the pre-compiler generates padding variables into the source code according to the UCF alignment. The declaration in FIG. 2 on the right introduces the integer pad for this purpose. The benefits of uniform structure sizes during checkpointing and recovery outweigh the possible loss of space efficiency incurred on all UCF-incompatible systems. All UCF data representations and alignments must be at least as large as the maximum values on all systems potentially being used. Data representation conversion, which happens on all systems incompatible to UCF, is done in-place on the shadow stack.

Existential Variables

Reduction of checkpoint size and thus overall checkpointing overhead is based on the identification of the state of a program at a potential checkpoint location at pre-compile time. The state consists of the set of existential variables at a given potential checkpoint location. A variable is existential at a potential checkpoint location $l_c$, if it is assigned before $l_c$, and appears in an expression after $1_c$.

The basic method for saving the existential variables of the stack is to visit all stack frames, and save the existential variables specified at pre-compile time. For a portable implementation, only function call and return instructions can be used safely. Consequently, checkpointing the stack is implemented by returning the function call sequence, thereby visiting each individual stack frame, and restoring the stack by calling the same function call sequence again. This method allows for identifying existential variables at pre-compile time, accessing each variable individually rather than block-copying the stack, and avoids non-portable implementations based on setjmp/longjmp pairs, as for example libckpt.

Checkpointing Methods

In accordance with a preferred embodiment of the invention, a method and apparatus for checkpointing the runtime stack will now be described. For simplicity, one can first consider only non-pointer variables on the runtime stack. The method can then be extended to support pointer variables.

The Stack

The basic approach for saving the variables on the stack is to visit each stack frame, and save its local variables identified at pre-compile time. A preferred embodiment would only save the live variables determined by data-flow analysis. The stack is checkpointed by returning the active function call sequence, thereby visiting each individual stack frame starting from the top of the stack down to the bottom. For each stack frame visited, the state of the local variables is pushed onto the shadow stack. The stack must then be restored by executing the original function call sequence again. c2ftc generates code to access each local variable by name rather than block-copying the stack. This eliminates problems caused by non-portable implementations based on setjmp/longjmp pairs, as for example used in libckpt, as disclosed in Plank, J. S., Beck M., Kingsley G., Li K. Libckpt: Transparent Checkpointing under Unix. In *Proceedings of the Unix Winter Technical Conference*, San Francisco, Calif., January 1995 which is incorporated herein by reference.

In order to preserve the program's state while checkpointing, none of the program's statements may be executed. Therefore, the program must be instrumented with function calls and returns to visit each stack frame during checkpointing without affecting the semantics of normal execution. Pre-compile time analysis identifies function call sequences that can lead to a potential checkpoint location. All functions that lie in such a sequence are subject to instrumentation.

For each function requiring instrumentation, stack growth may happen in one of two modes: normal execution, or stack restoration. For the latter, it is necessary to supply a "computed goto" at the top of the function body that causes a jump to the next function call in the call sequence leading to the checkpoint location. This is accomplished by c2ftc by inserting a jump table with go to statements to each of the function calls in the function body that can lead to a potential checkpoint location.

Stack shrinkage may also occur in one of two modes: normal execution, or stack saving when an activated checkpoint location is visited. For the latter, it is necessary to provide a function call wrapper that will save variables in the current stack frame upon return from the function call, and then cause a return from the calling function to save its parent's fame.

FIG. 3 shows a recursive program to compute Fibonacci numbers. Functions main and checkpoint can be provided in a library. Here, main is supplied only to clarify the function call sequence. The application consists of the functions chkpt_main, which substitutes for the original function main by renaming, and function fib. It is assumed that a potential checkpoint location is specified within fib by means of a call to function checkpoint. c2ftc transforms function fib into the code shown in FIGS. 4, 5 and 6. Function main is transformed analogously.

The program may execute in one of four modes. This mode of execution is kept in the global state variable _SL_chkptmode.

Normal Execution

During normal execution of the program the execution mode is set to _SL_EXEC. The jump table is skipped as shown in FIG. 4 and variable _SL_callid is assigned to encode the entry point into the function for use during the restore and recover phases as shown in FIG. 5.

Save Phase

The variables of the stack frames are saved on the shadow stack. Value _SL_SAVE is assigned to _SL_chkptmode in function checkpoint before it returns. Then, the variables of the calling function are stored, and this function returns. This process is repeated until all stack frames on the call sequence between main and checkpoint are popped from the runtime stack. Local variables, including __SL__callid, are saved by macro __SL__SAVE__fib__0 given as shown in FIG. 6.

Restore Phase

The runtime stack, which has been destructed during the save phase, is reconstructed during the restore phase by re-executing the original call sequence from main to checkpoint. Value __SL__RESTORE is assigned to __SL__chkptmode in function main. Since more than one function call may lie on a call sequence to checkpoint, variable __SL__callid is used to identify which call is in the call sequence being restored, cf. FIG. 5. Local variables are restored by macro __SL__RESTORE__fib__0 as shown in FIG. 6.

Recovery Phase

Recovery is almost the same as the restore phase. The only difference is that the variables have to be converted before they can be popped from the shadow stack, whereas during the restore phase they need to be restored, and then converted to be available in UCF representation on the shadow stack, cf. FIG. 4. The conversion function __SL__CONVERT__fib__0 is shown in FIG. 6.

Note that all variables on the runtime stack are accessed by name to push and pop them from the shadow stack as shown in FIG. 6. This renders the checkpointing code independent of differences in the organization of the runtime stack on different machines. Once the state of the runtime stack has been restored, the contents of the shadow stack is part of the checkpoint, which can be written to stable storage.

Pointers

The basic method for providing pointer portability is as follows—pointers are translated into displacements within the checkpoint. The implementation of this method step is described below.

Pointers are classified using two orthogonal categories: their target segments and the direction denoting the order in which the pointer and its target are pushed onto the shadow stack. The following target segments are common in UNIX environments, and have to be distinguished when treating pointers since segment addresses and sizes differ from target to target. In the UCF format, all pointer displacements are tagged to identify their target segments.

1. Stack Pointer

The shadow stack offset is the displacement between the pointer address on the shadow stack and its target on the shadow stack.

2. Heap Pointer

The shadow stack offset is calculated with respect to the bottom of the heap segment. The use of user-level memory management ensures that this offset is target invariant.

3. Data/bss Pointer

The shadow stack offset is the displacement between the pointer address on the shadow stack and its target on the shadow stack.

4. Text Pointer

These are function pointers or pointers to constant character strings in C. The latter do not require any special attention, because they will be available automatically after recovery. Function pointers are translated into a unique identifier assigned by the runtime system.

Pointers with these four targets can exist as automatic variables on the stack dynamically allocated variables on the heap, and as global variables in the data/bss segment. Note that the classification of pointers by their target segments permits the handling of pointer casting or the use of opaque pointers (e.g., void*) during parameter passing.

Pointers are also classified with respect to their direction relative to the order in which they are pushed onto the shadow stack:

1. Forward Pointer

The pointer is pushed on the shadow stack before its target object.

2. Backward Pointer

The pointer is pushed onto the shadow stack after its target object.

Call-by-reference parameters are pointers into an ancestor frame on the runtime stack. During execution, the stack frame (callee frame) containing a pointer passed as a parameter is always pushed onto the runtime stack after the caller's frame, During the save phase, the callee frame is pushed onto the shadow stack before the caller frame. Thus, all inter-frame pointers are forward stack pointers. Intra-frame pointers, on the other hand, may be either forward or backward stack pointers.

Stack Pointers

Forward and backward stack pointers must be treated differently when translating them into machine independent offsets. Accordingly, each will be considered separately starting with the forward stack pointer.

The conversion of a pointer into its portable offset, when it is saved on the shadow stack, is accomplished by introducing a temporary data structure called a pointer stack. The pointer stack keeps track of all pointers found on the runtime stack in order to effect its conversion into its corresponding offset. During the save phase, when a pointer is encountered, two actions are taken: (a) the pointer is copied onto the shadow stack, (b) its shadow stack address is pushed onto the pointer stack. This is necessary, because the location of the target on the shadow stack is not known yet.

During the restore phase, any object being restored to the runtime stack may potentially be the target of one or more pointers elsewhere on the runtime stack. When an object o is restored from address $A_o$, on the shadow stack, entries in the pointer stack are checked to see if the object is a pointer target. If so, for each such pointer on the pointer stack, the difference between the pointer's shadow stack address and the target shadow stack address $A_0$, is computed, and stored in the corresponding pointer stack entry.

Once the entire runtime stack has been restored, the computed displacements in the pointer stack are then written into the corresponding locations in the shadow stack, thereby overwriting the pointer target addresses with portable offsets.

Figure 8:
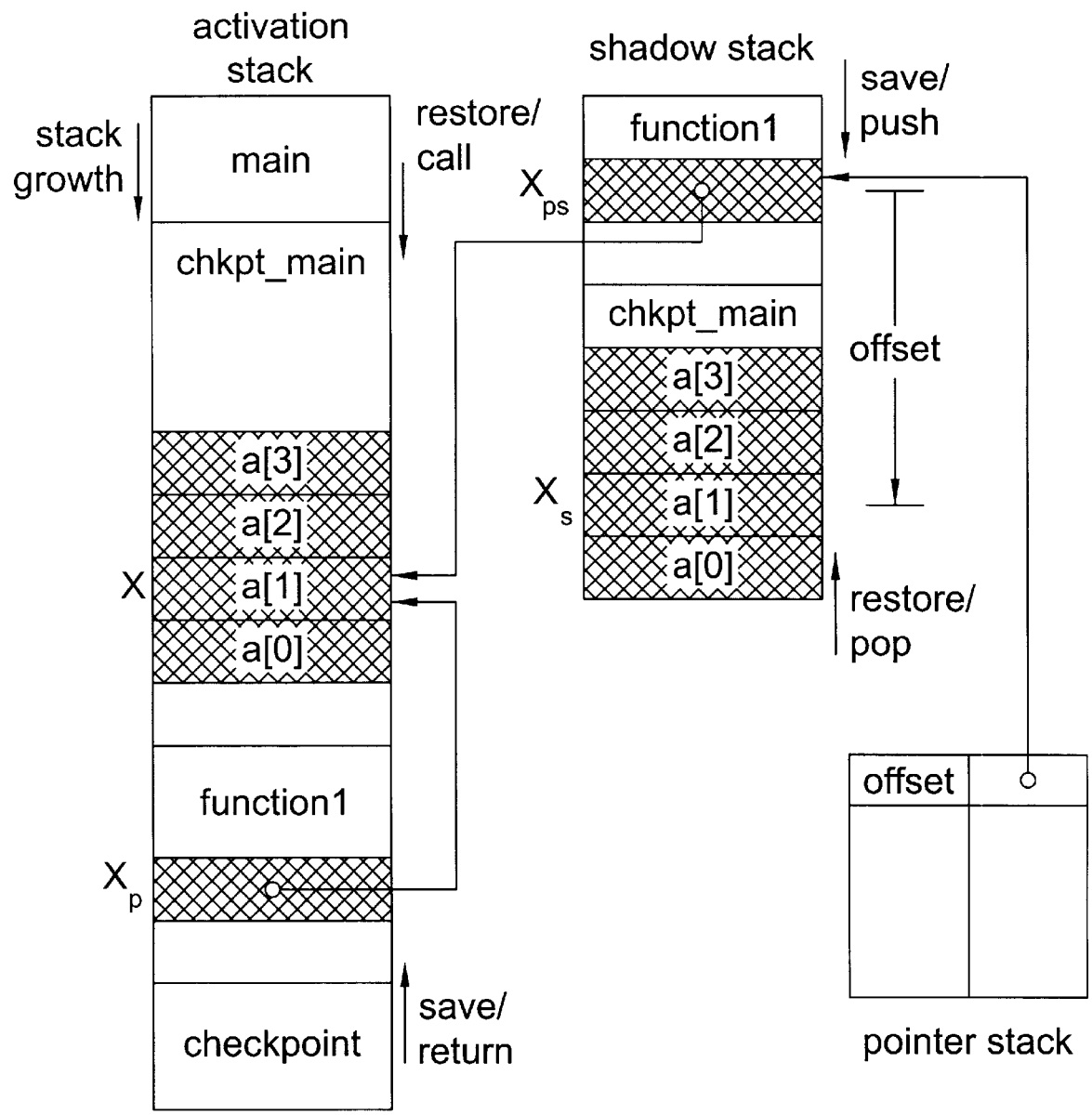
FIG. 8 shows checkpointing of the stack for the code fragment of FIG. 7 according to an embodiment of the invention.

As an example, consider the code fragment in FIG. 7 and the illustration in FIG. 8. During the save phase, the variables of function 1, in particular pointer p, are pushed onto the shadow stack. In FIG. 8, p is stored on stack at $X_p$, and pushed into $X_{ps}$ on the shadow stack. At this time, a pointer to p's address on the shadow stack $X_{ps}$ is pushed on the pointer stack. Next, the frame of chkpt__main is pushed onto the shadow stack. In FIG. 8, the target address of p is the array element a[1], marked X, and its shadow $X_s$.

During the restore phase, the frame of chkpt__main is restored before the frame of functions. Before restoring array a, the pointer stack is checked for a reference into a on the stack. In this example, the pointer in $X_{ps}$ points to address X. Note that for arrays it is necessary to check that $X_{ps}$, lies within the address range of the array a. The shadow stack offset can be computed according to the rule:

offset=pointer target address−pointer address, where both addresses are shadow stack addresses. In FIG. 8, offset=$X_s$−$x_{ps}$. $X_{ps}$ is retrieved from the pointer stack. Determining $X_s$ requires some additional offset computation. The offset cannot be stored immediately in $X_{ps}$, because it holds the value of pointer p, which is needed, when restoring the stack frame of functions. Once the entire stack is restored, a sweep through the pointer stack copies the offsets into the addresses on the shadow stack. Offset $X_s$−$X_{ps}$, will overwrite the value of p in address $X_{ps}$.

Forward Stack Pointers

Figure 9:
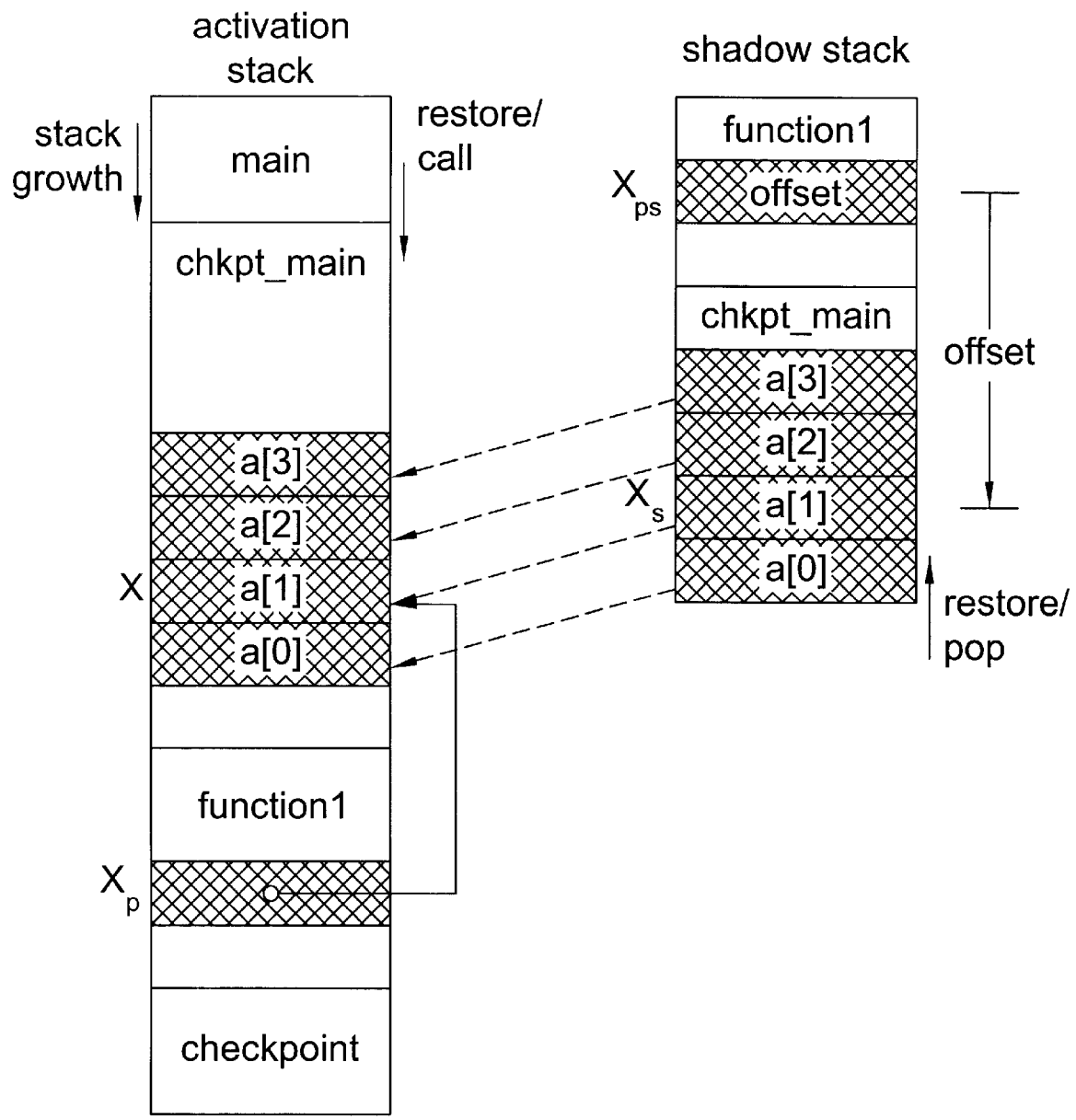
FIG. 9 shows recovery of the stack for the code fragment of FIG. 7 according to an embodiment of the invention.

Although recovery from a checkpoint is conceptually very similar to the restore phase, recovery of pointers presents a difference. All pointer offsets have to be transformed into virtual addresses again. Unlike the checkpointing transformation, this reverse transformation does not require a pointer stack. FIG. 9 illustrates the recovery from the checkpoint in FIG. 8.

Analogous to the restore phase, the shadow stack is restored from the top to the bottom, i.e., the frame of function chkpt_main is copied first. Note that a shadow stack pop operation affects an entire object. Array a is restored as a whole, not element-wise. In order to recover forward pointers—here p to a[1]—the address of each object's element on the runtime stack is stored in its location on the shadow stack after the value of the element has been restored on the runtime stack; cf. broken lines in FIG. 9. This mapping is needed, when functions are restored. The frame of functions contains the offset to a[1] in address $X_{ps}$. Recovering pointer p involves the transformation of the offset into the pointer. This requires the lookup operation:

$P=[X_{ps}+[X_{ps}]]$.

The pointer can be found in the shadow stack address which is computed according to the rule:

pointer address=shadow pointer address+offset.

This simple lookup is bought by saving the complete mapping of the restore target addresses on the runtime stack in the shadow stack. This expense is justified by the fact that recovery will be the infrequent case.

Backward Stack Pointers

The only backward pointers that might occur on the stack are intra-frame pointers. The number of backward stack pointers can be restricted to the case where the pointer target is another pointer by choosing the order in which variables are pushed on the shadow stack appropriately. c2ftc generates save and restore macros such that all nonpointer variables are saved after, and restored before, pointer variables. All pointers to non-pointer variables will then be forward pointers. Only a pointer pointing to another pointer may potentially be a backward stack pointer.

Figure 10:
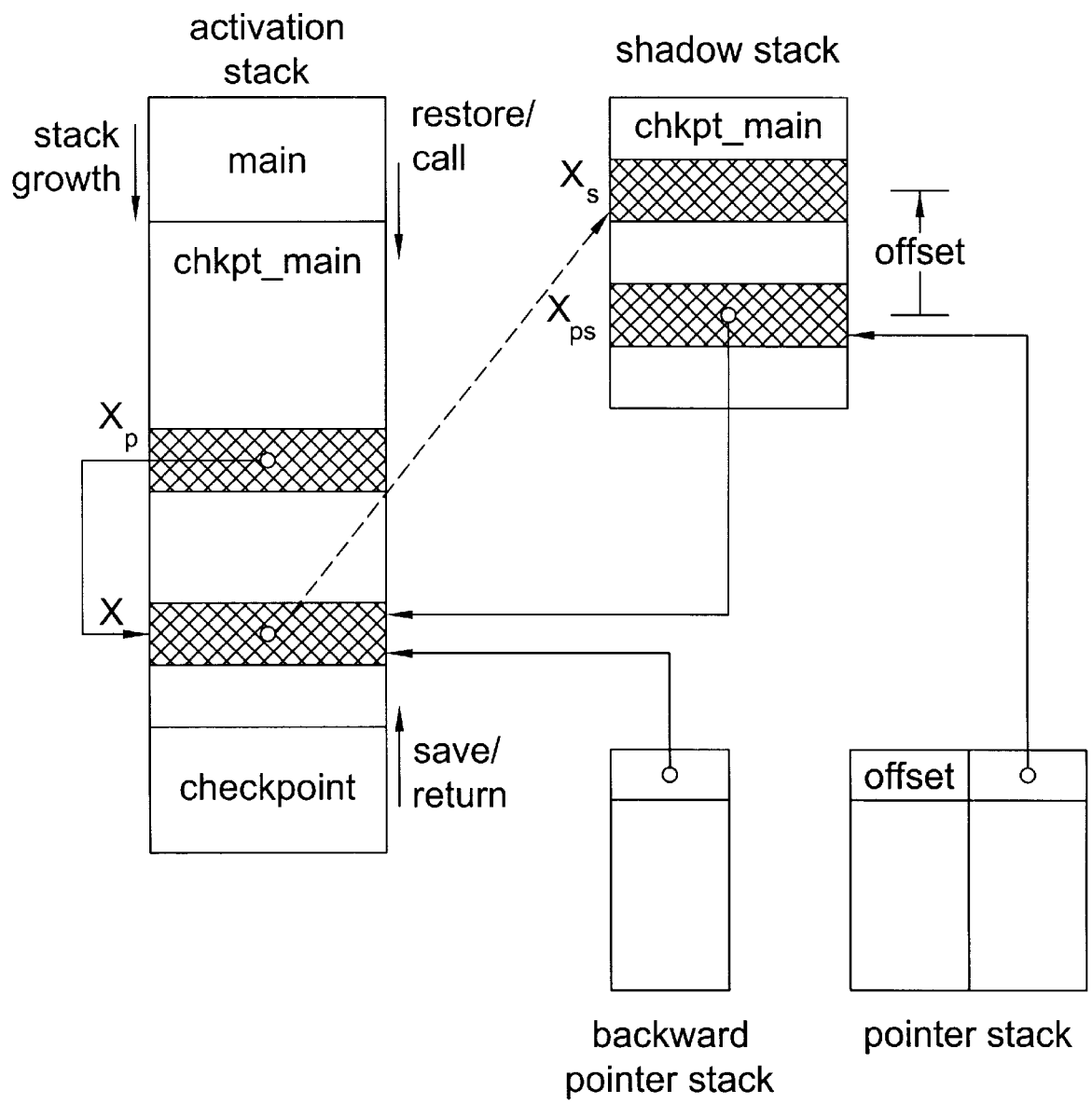
FIG. 10 shows checkpointing of backward pointers, according to an embodiment of the invention.

Checkpointing of backward pointers, according to an embodiment of the invention, is illustrated in FIG. 10, where $X_p$, is a backward stack pointer to X. To deal with backward pointers, the save method step presented thus far is modified as follows: for each stack frame, before saving any variables on the shadow stack, all pointer targets of backward pointers are saved in a data structure called the backward pointer stack. In FIG. 10, X, the pointer target of backward stack pointer $X_p$, is pushed onto the backward pointer stack.

Objects are then copied onto the shadow stack as before. If the object is pointed to from the backward pointer stack, i.e., it is a backward pointer target, its address on the shadow stack is saved temporarily by overwriting the object on the runtime stack with its address on the shadow stack. In the example, the value of X becomes $X_s$. Next, when the backward pointer in $X_p$ is saved, its shadow address $X_{ps}$ is pushed onto the pointer stack. Furthermore, since the pointer can be recognized as a backward stack pointer by comparing its target address with its own address, the offset is calculated, and saved on the pointer stack. In the example, the offset is $[X_p]$−$X_{ps}$=$X_s$−$X_{ps}$.

The restore phase is the same as before except that it requires the additional step of restoring backward pointers from the backward pointer stack to the runtime stack. Finally, the pointer stack offsets are transferred to the shadow stack as described earlier. Recovery of backward pointers can be implemented similarly to that of forward pointers. However, the pointer stack is needed to store the pointer's shadow address until the target is visited.

The difference in the treatment of forward and backward stack pointers is the computation of the offset. Whereas the offset of forward pointers is computed during the restore phase, offsets of backward pointers can be computed during the save phase, because the pointer target has been copied before the backward pointer is visited.

Data/Bss and Heap-Located Stack Pointers

Figure 11:
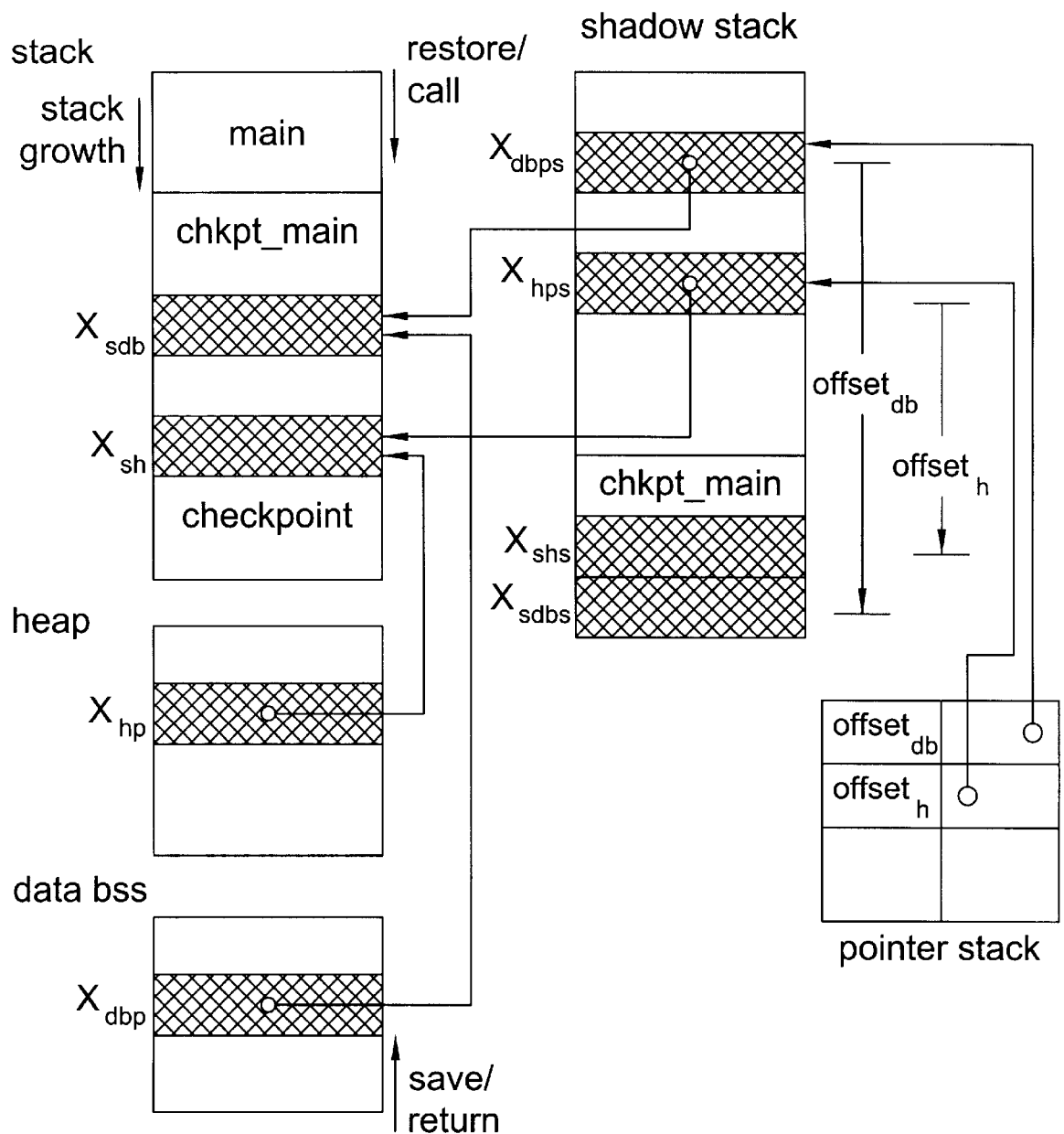
FIG. 11 shows checkpointing in the presence of forward stack pointers from heap and data/bss segments into the stack, according to an embodiment of the invention.

So far, the method has treated stack pointers located in the stack. Now consider stack pointers located in data/bss and the heap. FIG. 11 shows a stack pointer located in data/bss ($X_{dpb}$→$X_{sdb}$) and a stack pointer located on the heap ($X_{hp}$→$X_{sb}$). Since the order chosen to push segments onto the shadow stack is data/bss before heap before stack, both stack pointers are forward pointers. Forward pointers are resolved by means of a pointer stack analogous to the handling of stack pointers located in the stack as described above.

The following actions are added to the save and restore phases of the stack to handle the stack pointers in FIG. 11 located in data/bss and the heap:

Save Phase

Additionally to saving the existential variables on the shadow stack, push pointers to the shadow copies of $X_{dhp}$ and $X_{hp}$ in $X_{dbps}$ and $X_{bps}$ onto the pointer stack.

Restore Phase

When restoring stack pointer targets ($X_{sdb}$ and $X_{sh}$), calculate the corresponding offsets—the shadow stack pointer points to the target, used to recognize that the offset needs to be computed, and the pointer stack pointer to the pointer's shadow copy itself—and save them on the pointer stack. After the shadow stack has been restored, substitute the offsets for all pointers. In FIG. 11, assigned $X_{dbps}$←offset$_{db}$=$X_{sdbs}$−$X_{dbps}$ and $X_{hps}$←offset$_h$=$X_{shs}$−$X_{hps}$.

Figure 12:
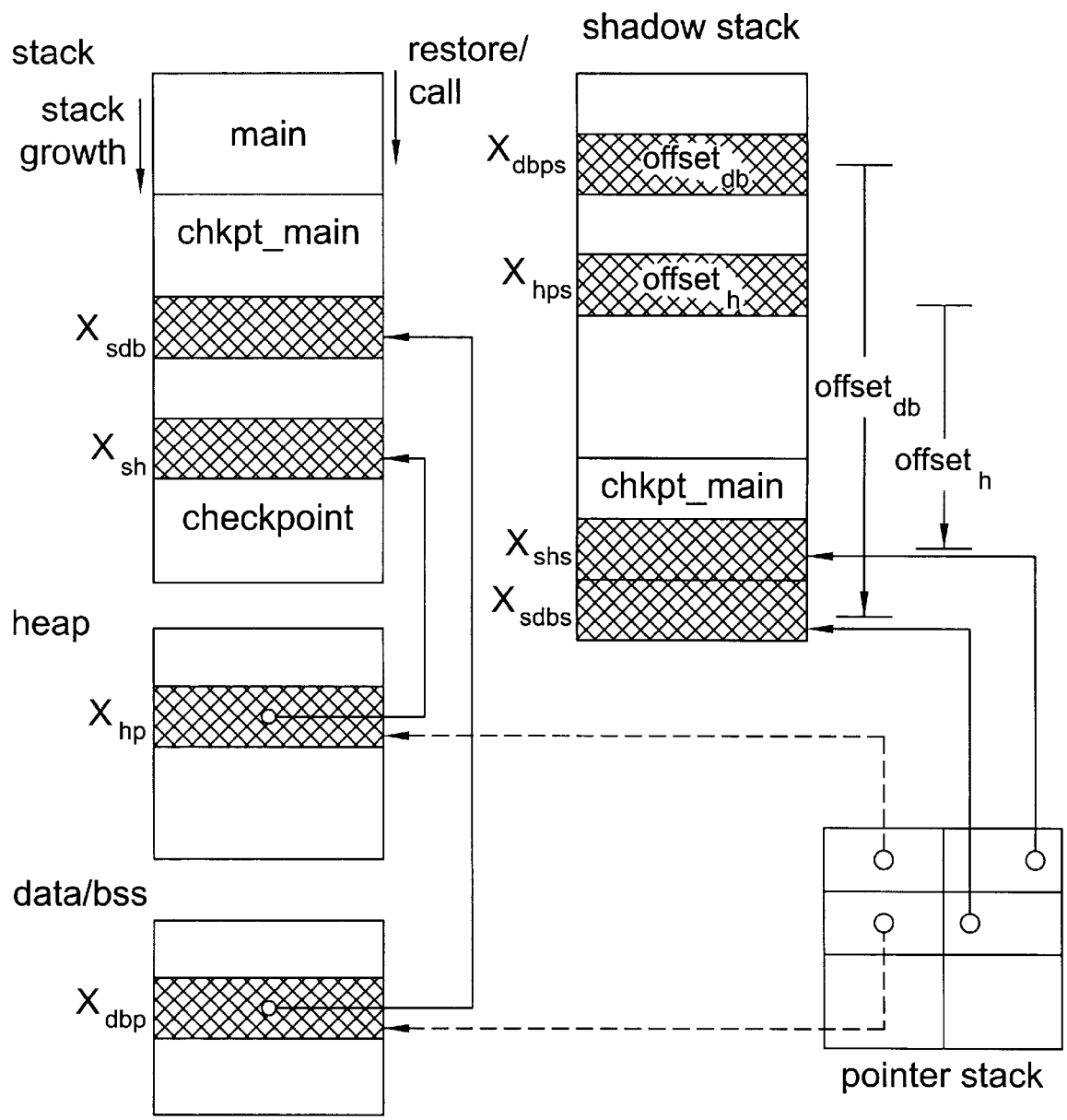
FIG. 12 illustrates recovery from the checkpoint for the stack pointers of FIG. 11, according to an embodiment of the invention.

Recovery from the checkpoint containing the stack pointers of FIG. 11 is illustrated in FIG. 12.

Restore Phase

First, data/bss and heap segments are restored. When arriving at a pointer, i.e., the offset on the shadow stack, a pointer to the corresponding target as well as to the pointer's origin in the activation space, accessed by name, is pushed onto the pointer stack. For example, when arriving at address $X_{dbps}$ in FIG. 12, pointers to the origins of $$X_{dbps}=X_{dbp}$$

and $$X_{sdbs}=X_{dbps}-[X_{dbps}],$$

where $[X_{dbps}]$=offset$_{db}$ are pushed onto the pointer stack. $X_{hps}$ is handled analogously.

After an object is restored, the pointer stack is checked to find those pointers pointing to the object. Here, the pointer in $X_{dbps}$ and $X_{hps}$ are forward pointers, and can be resolved in an single phase, because the targets are visited after the pointers themselves. When restoring the shadow addresses $X_{shs}$ and $X_{sdbs}$, the pointers on the pointer stack indicate that these are pointer targets. Since the corresponding addresses on the activation stack can be accessed by name, the pointers in $X_{hp}$ and $X_{dbp}$, accessible from the pointer stack, are assigned these addresses ($X_{sh}$, $X_{sdb}$).

Heap Pointers

Unlike the stack, the heap does not require restoration. Furthermore, all heap objects are aligned according to the UCF convention, so that all heap offsets remain invariant. Therefore, the offset computation of heap pointers is as follows: the offset is the heap pointer target address minus the heap bottom address. The distinction between forward and backward pointers is redundant for heap pointers.

Figure 13:
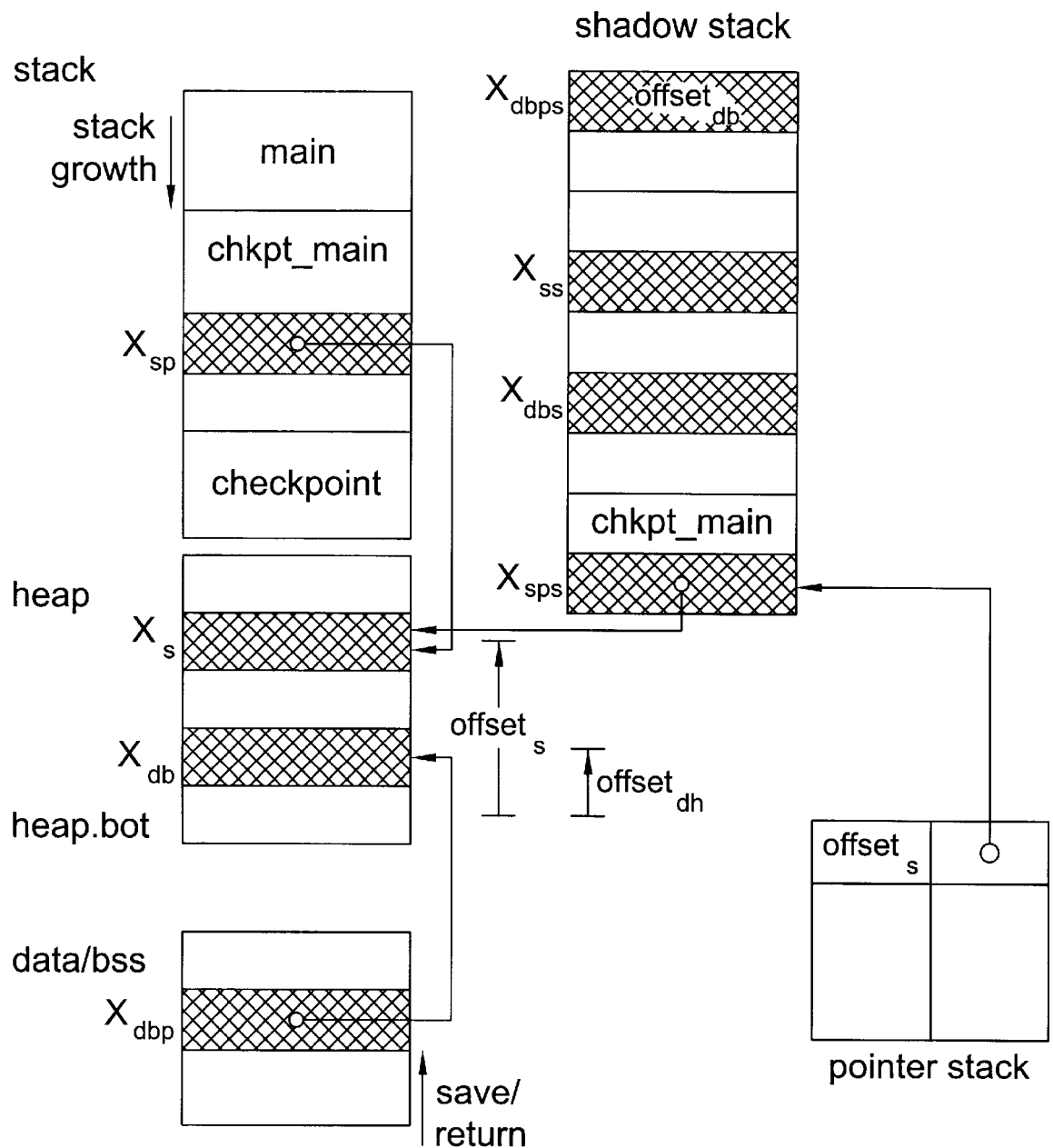
FIG. 13 shows the handling of heap pointers located in the data/bss segment and on the stack, according to an embodiment of the invention.

Instead of saving heap pointers located in the heap on the shadow stack, the offset can be saved immediately. The handling of heap pointers located in the data/bss segment and on the stack is illustrated in FIG. 13.

First, consider the heap pointer in the data/bss segment, located in address $X_{dbp}$, and pointing to $X_{db}$. Since the data/bss segment is pushed onto the shadow stack before the heap, all heap pointers in data/bss are forward pointers. However, since heap pointer offsets can be computed immediately when visiting the heap pointer, no pointer stack is required. In FIG. 13, the offset becomes offset$_{db}$=$X_{db}$−heap.bot, and is saved in $X_{dbps}$.

Next, treat the heap pointer in $X_{sp}$ on the stack. Since the stack needs to be restored, temporary storage is required for the offset that can be calculated during the save phase. This storage is provided by the pointer stack, as described above. During the save phase in the example, the offset that replaces the heap pointer shadow in $X_{sps}$ is computed offset$_s$=$X_s$−heap.bot and saved on the pointer stack. After restoring the stack, the offset replaces the copy of the heap pointer in $X_{sps}$.

The simplicity of the heap pointer treatment is paid for by a less space efficient heap memory management, which requires UCF compatible alignment. Since UCF specifies the largest data representations and alignments existing in the network, all UCF incompatible architectures suffer from a less space efficient data layout. This trade-off is justified by the fact that architectures are converging and memory capacities are growing.

Recovery of heap pointers is reasonably simple, because the memory layout of the heap is invariant, based on UCF alignment. All heap pointers can be recovered immediately by adding the offset stored on the shadow stack to the heap bottom address.

Data/Bss Pointers

Like the heap, the data/bss segment does not require restoration, with the exception of pointer target addresses. Unlike the heap, the data/bss segment may contain data that do not require checkpointing. For example, our runtime system provided in the shadow library, manages several book keeping tasks in the data/bss segment, resulting in a large amount of data that are not existential. Thus, analogous to the stack, the method only checkpoints the existential variables of the data/bss segment.

Since the data/bss segment is pushed onto the shadow stack before the heap and stack, all data/bss pointers located in the heap and stack are backward pointers. Since backward pointers can only be collected on the stack while saving the stack, the backward pointer stack cannot be built up before the save sweep. Consequently, the mapping from data/bss objects to their copies on the shadow stack must be saved when saving the data/bss segment. This is done by overwriting the word at the base address of the data/bss object with its shadow address (cf. broken lines in FIG. 14).

After the data/bss segment, the heap is saved. The data/bss pointer on the heap can be resolved immediately, because the data/bss shadow mapping is available offset$_h$=[[$X_{hp}$]]−$X_{hps}$ is saved in $X_{hps}$ of the shadow stack.

The data/bss pointer on the stack can be resolved during the save phase, because it is a backward pointer offset$_s$=[[$X_{sp}$]]−$X_{sps}$ is pushed together with a pointer to the pointers shadow in $X_{sps}$ onto the pointer stack. After the stack is restored, and during the pointer substitution sweep, the pointer on the shadow stack will be replaced by the offset.

Additionally, a restore phase is needed for the data/bss segment to copy the shadow values of all object base addresses back into the activation segment. Since the pointers to these values are stored in the base addresses, this substitution is straightforward, for example, $X_s$←[[$X_s$]].

Figure 15:
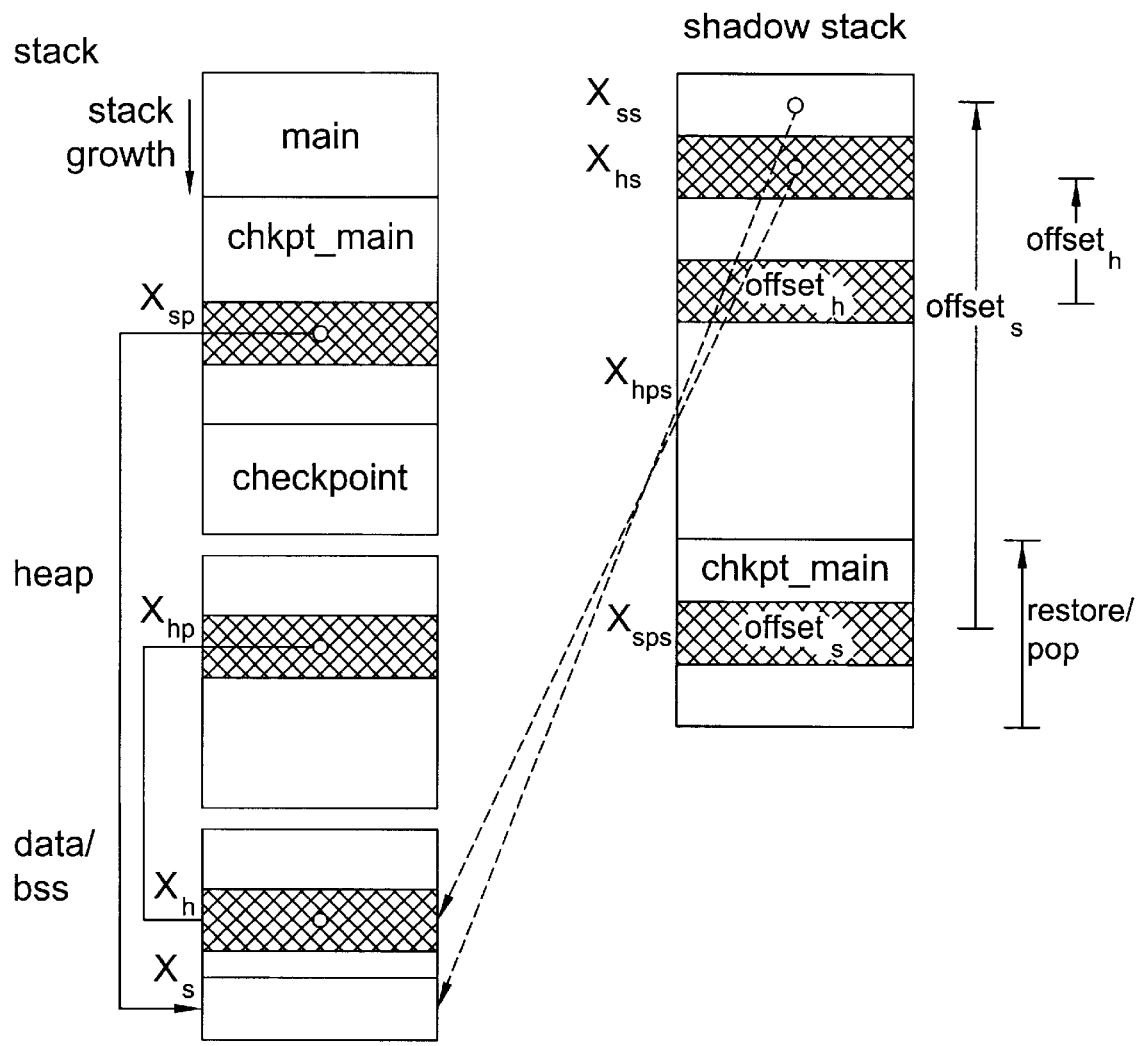
FIG. 15 shows recovery in the presence of data/bss pointers located on the stack and heap, according to an embodiment of the invention.

Recovery in the presence of data/bss pointers located on heap or stack is analogous to the recovery of stack-located stack pointers. Since the data/bss segment is restored first, pointer targets in data/bss cannot be recognized while restoring this segment. Consequently, the mapping from the data/bss shadow addresses to the activation addresses needs to be stored. This is done by overwriting the shadow stack values, as indicated by the broken lines in FIG. 15.

When restoring the data/bss pointers on the heap and stack, these pointers can be computed by means of the lookup operation:

$$X_{hp}77 [X_{hps}+[X_{hps}]]$$

and $$X_{sp}←[X_{sps}+[X_{sps}]].$$

Figure 14:
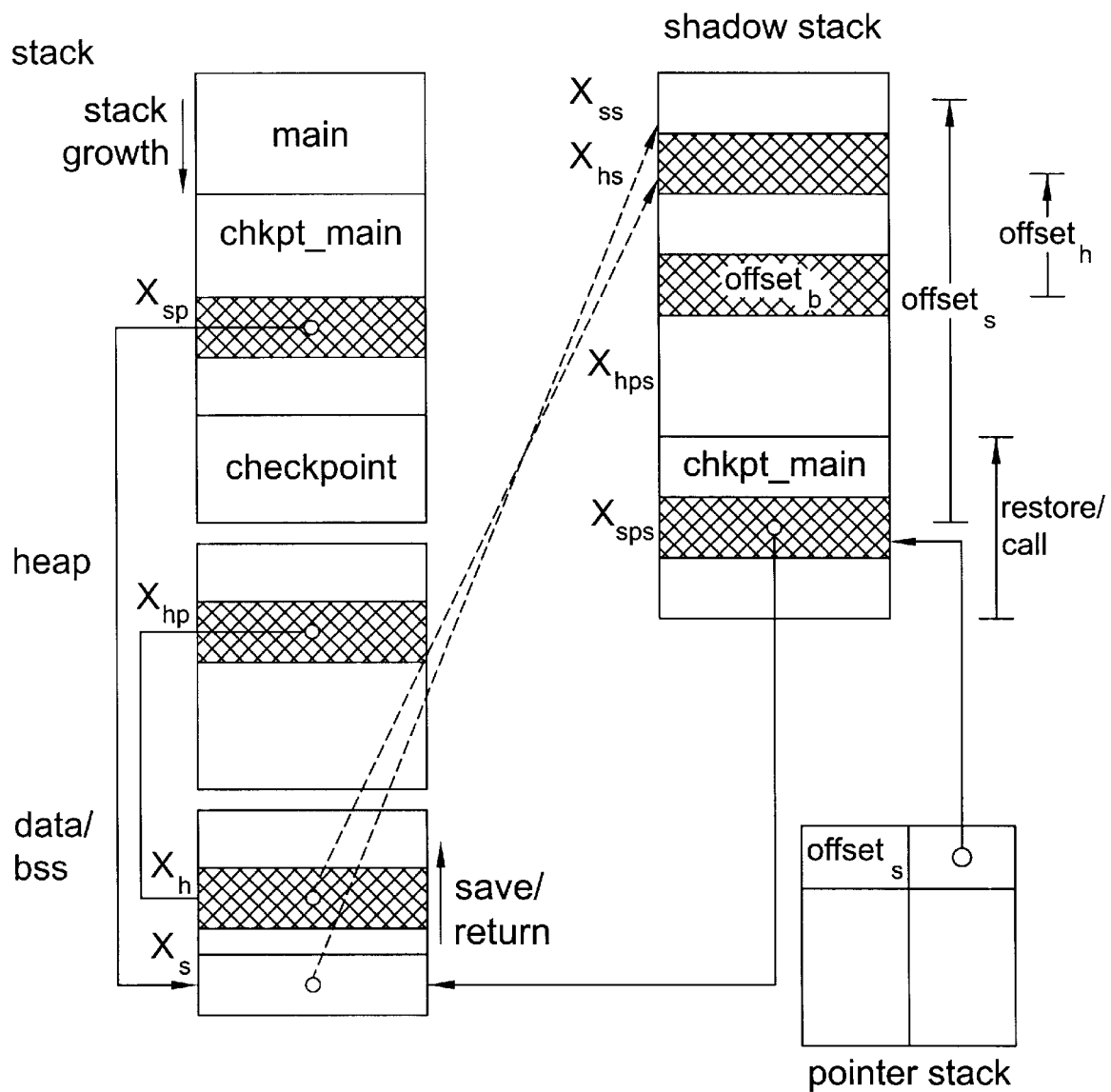
FIG. 14 shows checkpointing in the presence of data/bss pointers located on the stack and heap, according to an embodiment of the invention.
Figure 16:
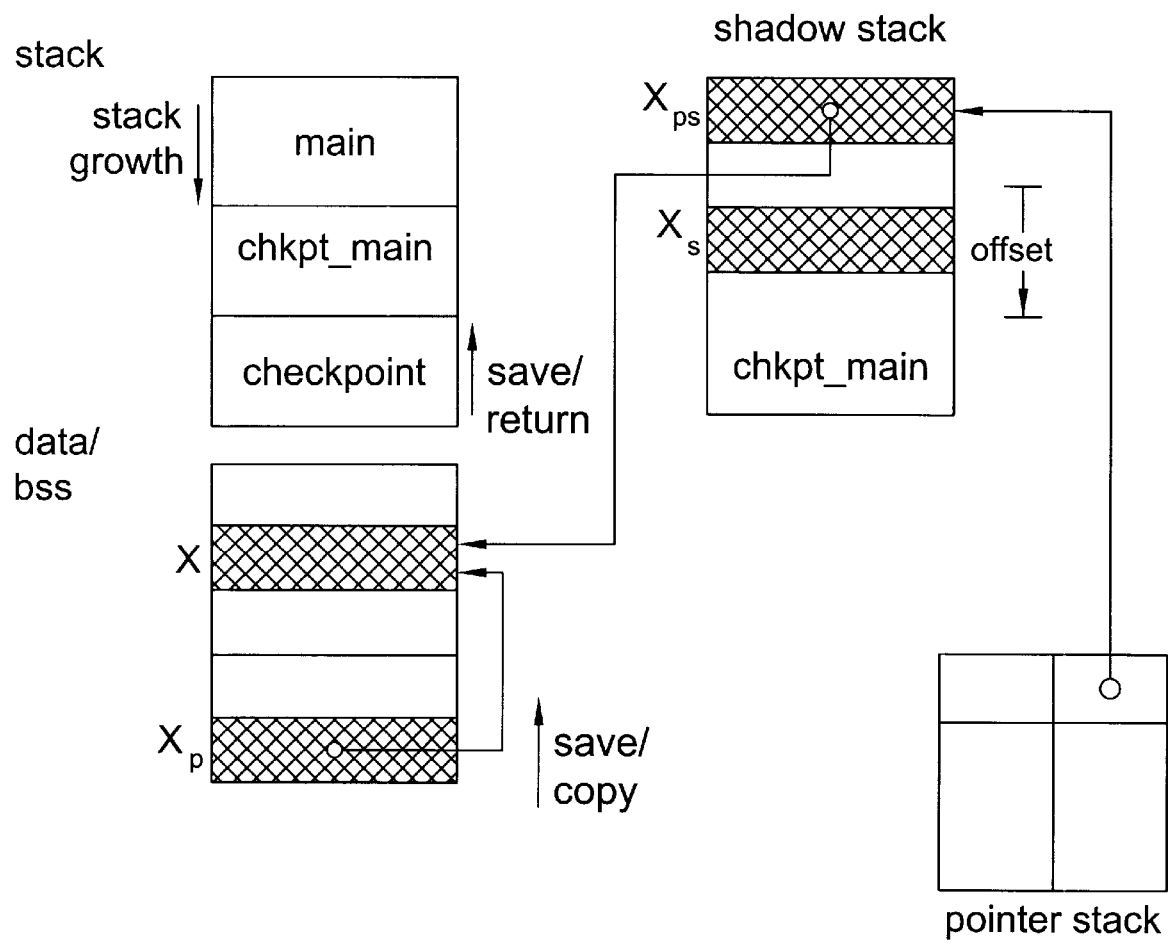
FIG. 16 shows checkpointing in the presence of forward pointers (forward referring to the direction of save traversal) within the data/bss segment, according to an embodiment of the invention.

During checkpointing, backward data/bss pointer located in the data/bss segment can be resolved immediately, because the target's shadow stack address can be found in the pointer target address, as indicated by the broken lines in FIG. 14. Data/bss-located forward data/bss pointers, however, require the use of the pointer stack to save the pointer's shadow address until the pointer target's shadow address is known. FIG. 16 illustrates this case. When the pointer target X is saved, the offset can be computed and stored in $X_{ps}$ immediately.

Recovery of data/bss-located data/bss pointers requires distinguishing between forward and backward pointers. With forward pointers, the pointer will be restored before its target. Consequently, the pointer stack is required to save the pointer temporarily. For backward pointers the method explained above (FIG. 15) can be applied.

Optimizations

The separation of checkpointing into two phases offers an advantage for handling pointers: During the save phase, all pointers are gathered on the pointer stack. Maintaining the pointer stack as a sorted list reduces the complexity of checking the pointer stack from O(n) to O(1) An O(n log n) sorting algorithm reduces the overall overhead for m potential pointer targets from O(n*m) to O(n log n+m). Unlike inter-frame pointers, intra-frame stack pointers can be resolved during the save phase. Introducing a separate "resolved pointer stack" to store offsets that can be computed during the save phase will improve performance by reducing n.

To reduce the overhead caused by forward pointers, the declaration list of variables can be reordered such that all pointers are declared after non-pointer variables. As a result, all intra-frame stack pointers and data/bss pointers to non-pointer targets will become backward pointers.

Further optimizations are also possible when checkpointing heap memory. Since memory management is performed by the runtime system, separately used and free lists of allocated blocks are maintained. Only blocks on lists of allocated blocks are maintained. Only blocks on the used list are currently checkpointed. This, however, may include unreachable memory that has been allocated but not freed. It may be cost effective to perform garbage collection before checkpointing the heap to further reduce the amount of information that needs to be checkpointed.

Experimental Results

Two types of experiments were performed to evaluate the performance of portable checkpoints: (1) Microbenchmarks to shed light on the causes of overhead, and (2) three small application programs to demonstrate the runtime efficiency of one embodiment of the invention, in particular checkpointing overhead and performance in the presence of failures.

Microbenchmarks

Two simple programs are used to analyze the overhead induced by portable checkpoints:

1) The recursive formulation of the Fibonacci number computation shown in FIG. 4 consists almost entirely of checkpointing instrumentation overhead,
2) A simple version of the C-library function memcpy demonstrates the runtime penalty. All runtimes reported are average values of five measurements.

Code Instrumentation Penalty

The transformation of the Fibonacci program in FIG. 3 into the code in FIG. 4 results in a good test case for the runtime overhead due to code instrumentation. The extremely fine granularity of function fib yields a program to measure the destruction and reconstruction of small stack-frames corresponding to the save and restore phases, whenever the base case of the recursion is visited.

FIG. 17 shows fib(35) without storing checkpoints, but executing the save and restore phases of the Shadow Checkpoint Algorithm. Not surprisingly, code instrumentation generates substantial overhead for the Fibonacci example. Since this example represents the pathological case where each function call represents an insignificant amount of computation, it provides an empirical upper bound on the runtime penalty paid by the instrumentation.

Shadow Stack Overhead

The C-library routine memcpy copies the contents of an array bytewise into another array. In this example, two arrays on the heap are allocated, and pass pointers to their base addresses to the memcpy routine, analogous to the code in FIG. 7. Within this routine is a loop, that copies the array contents bytewise. A potential checkpoint location is specified within this loop.

The size of the two arrays is $10^6$, bytes. Thus, the checkpoint function is entered $10^6$ times. Since two large arrays are checkpointed entirely and the function calling sequence is only 2 deep, the checkpointing overhead is dominated by copying these arrays. Thus, this benchmark complements the measurement of the stack induced overhead of the Fibonacci program.

FIG. 18 shows the runtimes of different systems without checkpoint instrumentation (plain), with instrumentation but without storing a single checkpoint (instr), saving one checkpoint specified by using an appropriate timer value—on the shadow stack without writing it to disk (copy), saving one checkpoint on the shadow stack and writing it to a local disk (local) and via NFS to a remote disk (NFS).

The overhead of code instrumentation is the difference of instr-plain. The cost of saving a single checkpoint on the shadow stack, including save and restore phase is the difference copy-instr. The time to store a single checkpoint to local or remote disk is local-copy or NFS-copy, respectively. The Linux PC was not connected to NFS for these experiments.

As expected, transferring the checkpoint to remote disk is the most expensive portion of checkpointing that determines the MinTBC (minimum time between checkpointing) eventually. Furthermore, the instrumentation overhead is not negligible, suggesting that potential checkpointing locations should be chosen carefully. The copying overhead onto the shadow stack is tolerable, because it enables us to hide the more time consuming transfer to disk with useful computation.

Application

Three applications are used to measure the overhead of checkpointing. Two applications, a Jacobi-type iteration and a matrix multiplication are floating point intensive and operate on large data sets, resulting in large checkpoints. The third application is a recursive depth-first search of prime numbers, which generates a deep stack hierarchy, where the stack save and recovery phases dominate the checkpointing overhead. Furthermore, the Jacobi-type iteration is also used to measure the lower bound of the runtime of the program in the present of failures.

FIG. 19 shows the amount of data stored in the checkpoints. The difference between checkpoint file sizes and the sum of the corresponding segment sizes is the checkpoint header size (64 bytes). No dynamic variables are allocated in prime; the 20 bytes of the heap segment contain memory management information.

All experiments are performed with sequential checkpointing, where the program is halted to copy its state onto the shadow stack, then writes the checkpoint to disk, and, after completion, continues to program execution. Optimizations, such as proposed in Elnozahy E. M., Johnson D. B., Zwaenepoel W. The performance of consistent checkpointing. In *IEEE Symposium on Reliable and Distributed Systems*, pages 39–47, October 1992 and Plank J. S., Beck M., Kingsley G., Li K. Libckpt: Transparent Checkpointing under Unix. In *Proceedings of the Usenix Winter Technical Conference*, San Francisco, Calif. January 1995 which are incorporated herein by reference, can be applied.

Heat Equation

A Jacobi-type iteration is used to solve the heat diffusion problem on a 256×256 grid, executing 1,000 iterations. Two dynamically allocated two-dimensional double arrays are used, one to hold the temperature values of the current iteration, the other to store the results of the five-point-stencil computation.

Figure 20A:
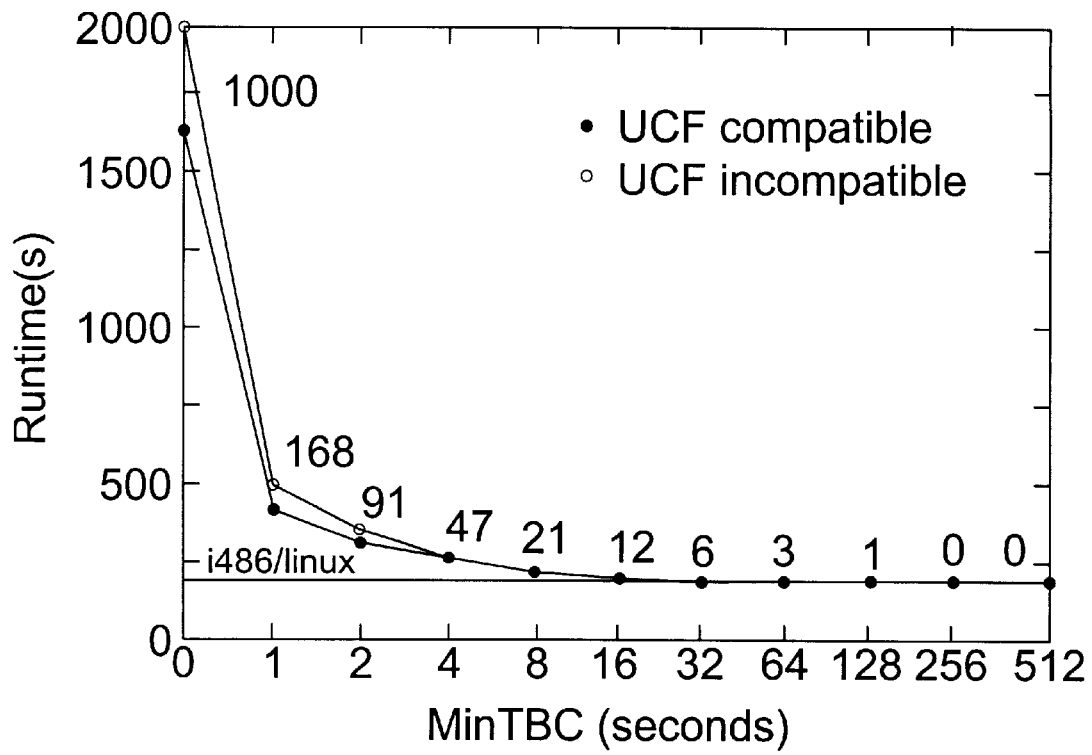
FIGS. 20A–C summarize the results of experiments with checkpointing to the local disk, according to an embodiment of the invention.
Figure 20B:
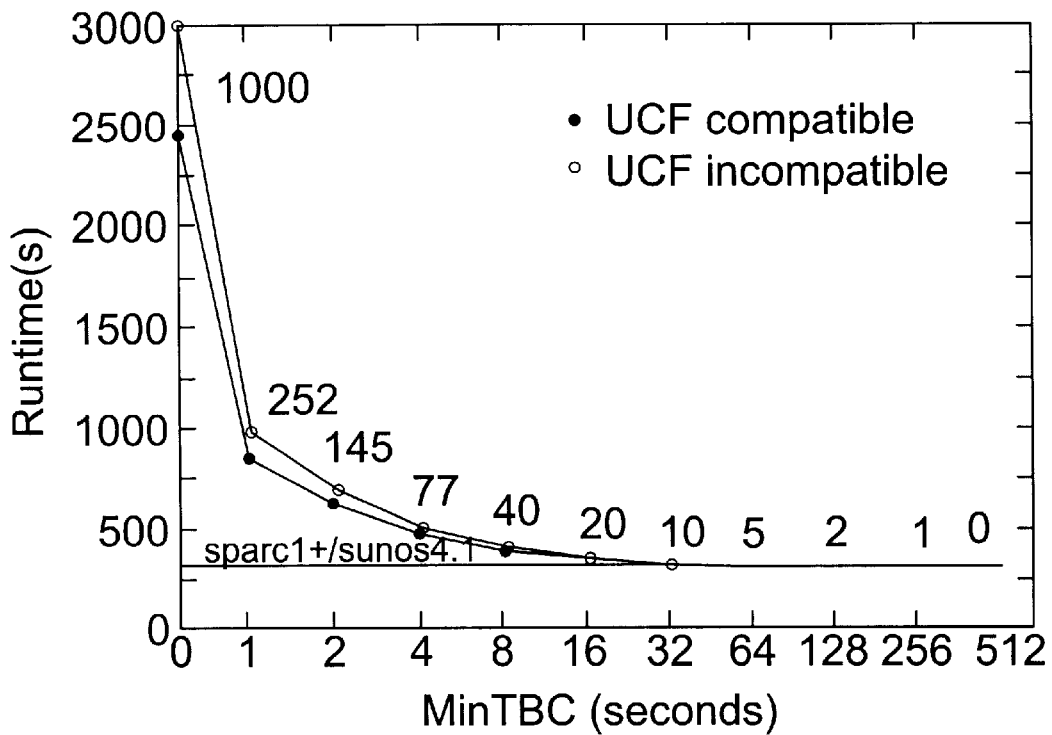
Figure 20C:
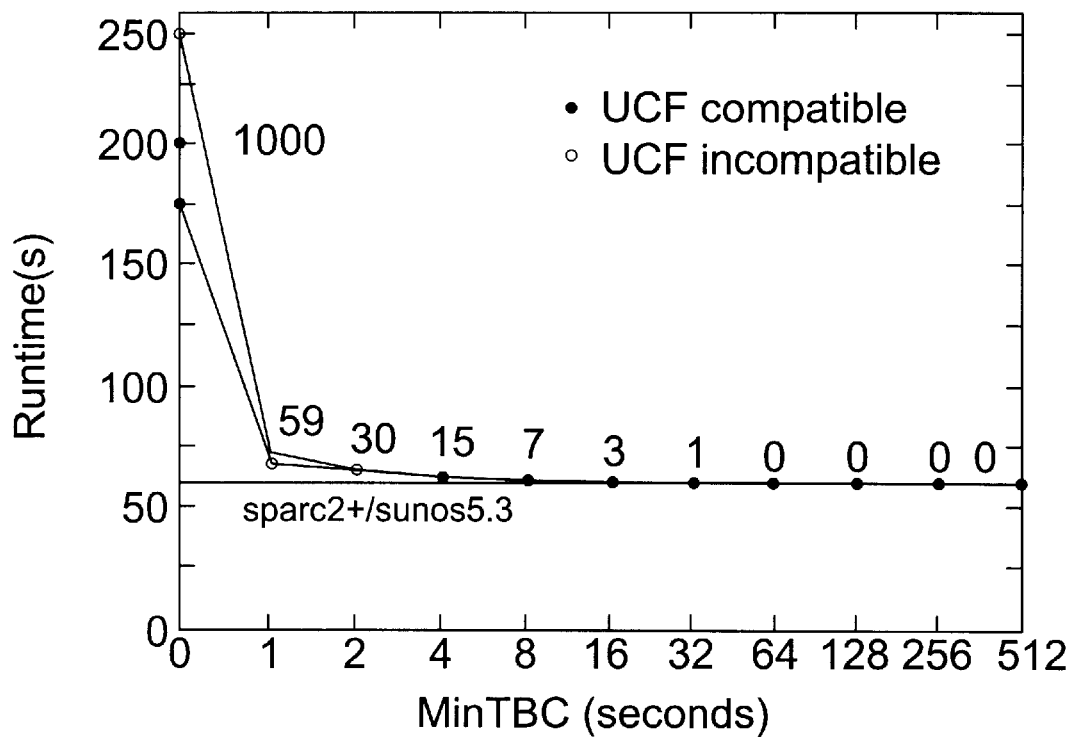

The potential checkpoint location is placed within the outer iteration loop. It is thus visited 1,000 times. FIGS. 17A–C summarize the results of our experiments with checkpointing to the local disk. The runtimes are measured for a range of MinTBC (time value) between 0 and 512 seconds. For MinTBC=O, each potential checkpoint location is activated. The graphs in FIGS. 20A–C plot the runtimes for UCF compatible and UCF incompatible checkpointing, Checkpointing is UCF compatible, if the UCF specification matches the system architecture, so that no conversion is required. With UCF incompatible checkpointing, alignments and conversions are performed on the i486 to match the format of the SPARCstations and vice versa. The node attributes give the number of checkpoints saved for the corresponding MinTBC.

FIGS. 20A–C illustrate how often checkpoints can be saved without affecting performance substantially, On all systems, a checkpointing interval (MinTBC) larger than 32 seconds restricts the overhead to less than 10%. Although this value depends on the checkpoint size, it is small compared to typical system MTBF values. Note that the conversion penalties paid for UCF incompatibility are only severe, if the checkpointing frequency becomes unrealistically high, i.e., MinTBC is very small.

Columns labelled $t_{rec}$ in FIGS. 20A–C give the minimum run times of the program, if failures occur approximately every MinTBC. This "ideal" failure situation is simulated by exiting the program just after a checkpoint has been stored, capturing the exit status within a shell script that immediately invokes the program again with the recover option enabled. Since the program is aborted immediately after a checkpoint is stored, no recomputation of lost computation is required. Furthermore, the time for failure detection as well as downtimes are approximately zero. Since the state is recovered from local disk, no overhead is incurred by transferring the checkpoint via the network.

A single recovery on a UCF compatible architecture costs about 2 s on the i486, about 1.5 s on the SPARCstation1+, and 0.4 s on the SPARCstation2O. These numbers are determined by the use of the local disk as stable storage for the checkpoint. All systems suffer from an overhead penalty due to data representation conversion during recovery. The difference between the runtimes of the recovered experiments with UCF incompatible architectures and UCF compatible architectures give the overhead of two conversions, one during checkpointing and the other during recovery.

Matrix Multiplication

The dense matrix-matrix multiplication, implemented by Plank J. S., Beck M., Kingsley G., Li K. Libckpt: Transparent Checkpointing under Unix. In *Proceedings of the Usenix Winter Technical Conference*, San Francisco, Calif., January 1995 which is incorporated herein by reference, is instrumented for this benchmark. FIG. 21 summarizes the runtimes and overheads for the checkpointed dense matrix-matrix multiplications of two dense 615×615 matrices without failures.

The performance of the i486 is dominated by its local disk performance. Data conversion overhead of the UCF incompatible run times if submerged by the variance of the disk performance, which is primarily caused by swap activity. The 8 MB of main memory cannot quite hold Linux plus two copies of the three matrices one on the run time heap and the other on the shadow stack. Consequently, even a single checkpoint adds a significant overhead of 20–30%. This leads to two conclusions: (1) Avoid swapping by choosing the problem size such that stack and heap segments as well as shadow stack fit into main memory. As future memory capacities are growing, it is more likely that cache effects will determine performance. (2) Dense matrix-matrix multiplication is a basic linear algebra operation that hardly appears standalone, but is usually embedded within a larger application. Obviously, it is more sensible to checkpoint after the multiplication rather than within. Such observations raise interesting incentives for pre-compiler data flow analysis to identify potential checkpoint locations automatically.

The SPARCstation1+measurements show that data conversion adds a significant overhead of approximately 5% compared to the UCF compatible runtimes. Storing checkpoints to the local disk introduces an overhead that depends on the capability of the memory buffers for disk access and the speed of the disk. Obviously, the i486 system delivers a substantially better local disk performance than the SPARCstation1+. When storing the checkpoint to remote disk, as presented for the SPARCstation20, the overhead increases dramatically, as already shown with the memory micro-benchmark.

Prime

The prime benchmark uses a recursive divide-and-conquer algorithm to compute the primes among all natural numbers less than a user-specified upper bound. The user also specifies a grain size which determines the depth of the divide-and-conquer tree. The range 2-upper bound is recursively partitioned into two equal halves until each partition is less than or equal to the grain size. An optimized Eratosthenes sieve algorithm is used on each partition to determine which numbers in that range are prime. The conquer phase is used to compute the total number of primes found.

FIG. 22 shows the results of running prime without failures on the first 10,000,000 natural numbers with a grain size of 250. The last line in the table provides the reference measurement without any checkpointing or instrumentation overhead. All overheads are reported relative to this case. Note that when checkpoints are taken every 2 seconds, the overhead on all three machines is less than 7%. Although not reported here, the data for writing to a remote disk via NFS yields marginally higher overheads for checkpoints taken every 2 seconds or greater. This is not surprising since the size of each checkpoint is relatively small with less than 11 K bytes (see FIG. 19). Note that the prime example of evolutionary computer architecture, the i486, is up to three times faster than a SPARCstation 20, and almost 10 times faster than a SPARCstation1+.

Additional Preferred Embodiments

Figure 23A:
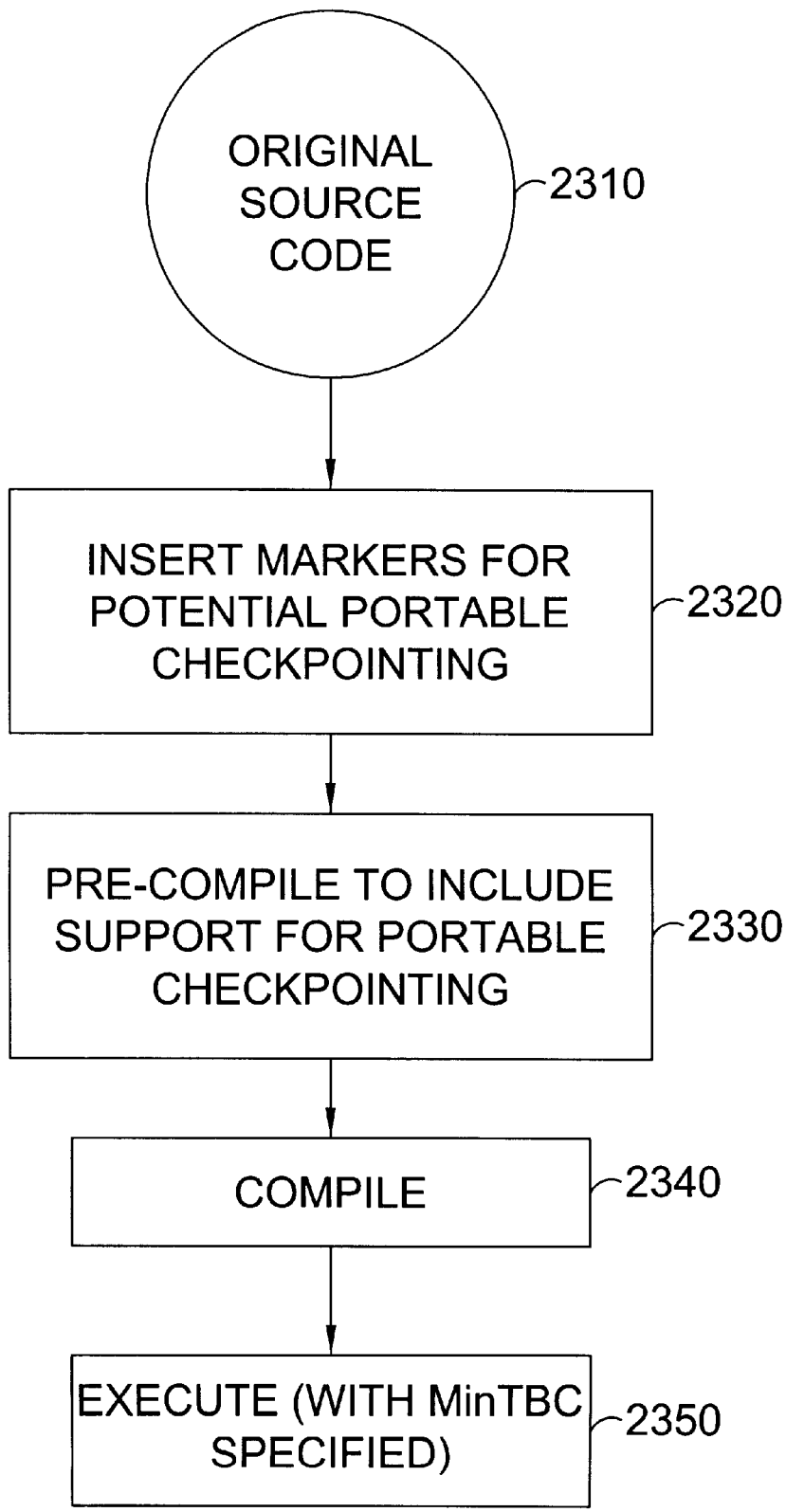
FIG. 23A shows a method of pre-compiling input source code and outputting an output source code which includes support for portable checkpointing, according to a preferred embodiment of the invention.

FIG. 23A shows a method of pre-compiling input source code and outputting an output source code which includes support for portable checkpointing, according to a preferred embodiment of the invention. The input for the method is original source code 2310 which can be written in any general purpose language (e.g., C, C++, Fortran, Java, etc.). Original source code 2310 is input to step 2320 which involves inserting markers for potential portable checkpointing. Step 2320 can be implemented by a programmer who manually inserts portable checkpointing markers, or alternatively, it can be implemented automatically, for example, by a pre-compiler.

The method proceeds from step 2320 to step 2330 which involves pre-compiling the input source code, from step 2320, to produce output source code which includes support for portable checkpointing. The locations of the included support for portable checkpointing is related to the markers which were inserted in step 2320. Since marker insertion step 2320 could be implemented with a pre-compiler, in one embodiment of the invention, steps 2320 and 2330 can be combined into a single pre-compile step.

The method proceeds from step 2330 to step 2340 which involves compiling the output source code to produce object code. It is important to note that by performing the addition of support for portable checkpointing in pre-compile step 2330 rather than in compile step 2340, the method has achieved independence from the specific machine object code. In other words, by inserting the support for portable checkpoints during the source-to-source pre-compile step 2330, the method is interoperable with a variety of different compilers.

The method proceeds from step 2340 to step 2350 which involves executing the code on a particular processing platform. During execution step 2350, the method determines which of the portable checkpoints will actually be implemented, for example, based upon a MinTBC (Minimum Time Between Checkpoints).

Figure 23B:
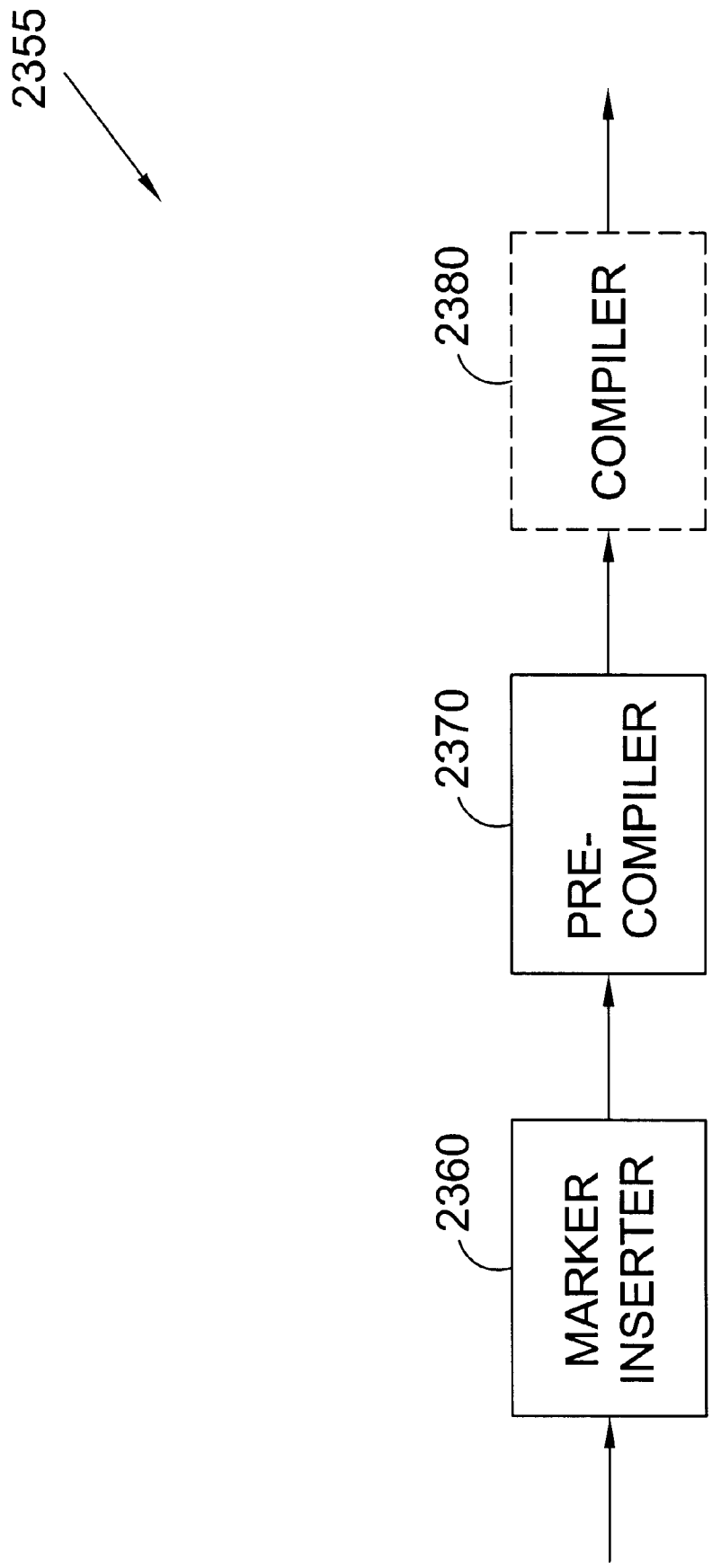
FIG. 23B shows an apparatus of pre-compiling input source code and outputting an output source code which includes support for portable checkpointing, according to a preferred embodiment of the invention.

FIG. 23B shows an apparatus 2355 for pre-compiling input source code and outputting an output source code which includes support for portable checkpointing, according to a preferred embodiment of the invention. Apparatus 2355 includes a marker inserter 2360 and a pre-compiler 2370. In addition, apparatus 2355 can further include a compiler 2380.

Original source code is input to the marker inserter which inserts markers for potential portable checkpointing. The output of marker inserter 2360 is input source code which is input to pre-compiler 2370. Pre-compiler 2370 which pre-compiles the input source code to produce output source code which includes support for portable checkpointing.

In a further embodiment, apparatus 2355 can include compiler 2380 which receives the output source code from pre-compiler 2370 and compiles the output source code to produce object code.

Marker inserter 2360, pre-compiler 2370, and compiler 2380 can be implemented in a variety of ways. For example, marker inserter 2360 and pre-compiler 2370 can be combined into a single pre-compiler as previously discussed. Alternatively, each of the elements could be implemented on totally independent platforms. In addition, each of these elements can be implemented using any combination of software, firmware, and hardware depending on the requirements of the specific application. For example, a hardware implementation could include use of a single platform with a single processor or multiple processors for implementation of all of the elements. Alternately, each element in apparatus 2355 could be implemented on a single or multiprocessor. Firmware for each element could also be implemented.

Figure 24:
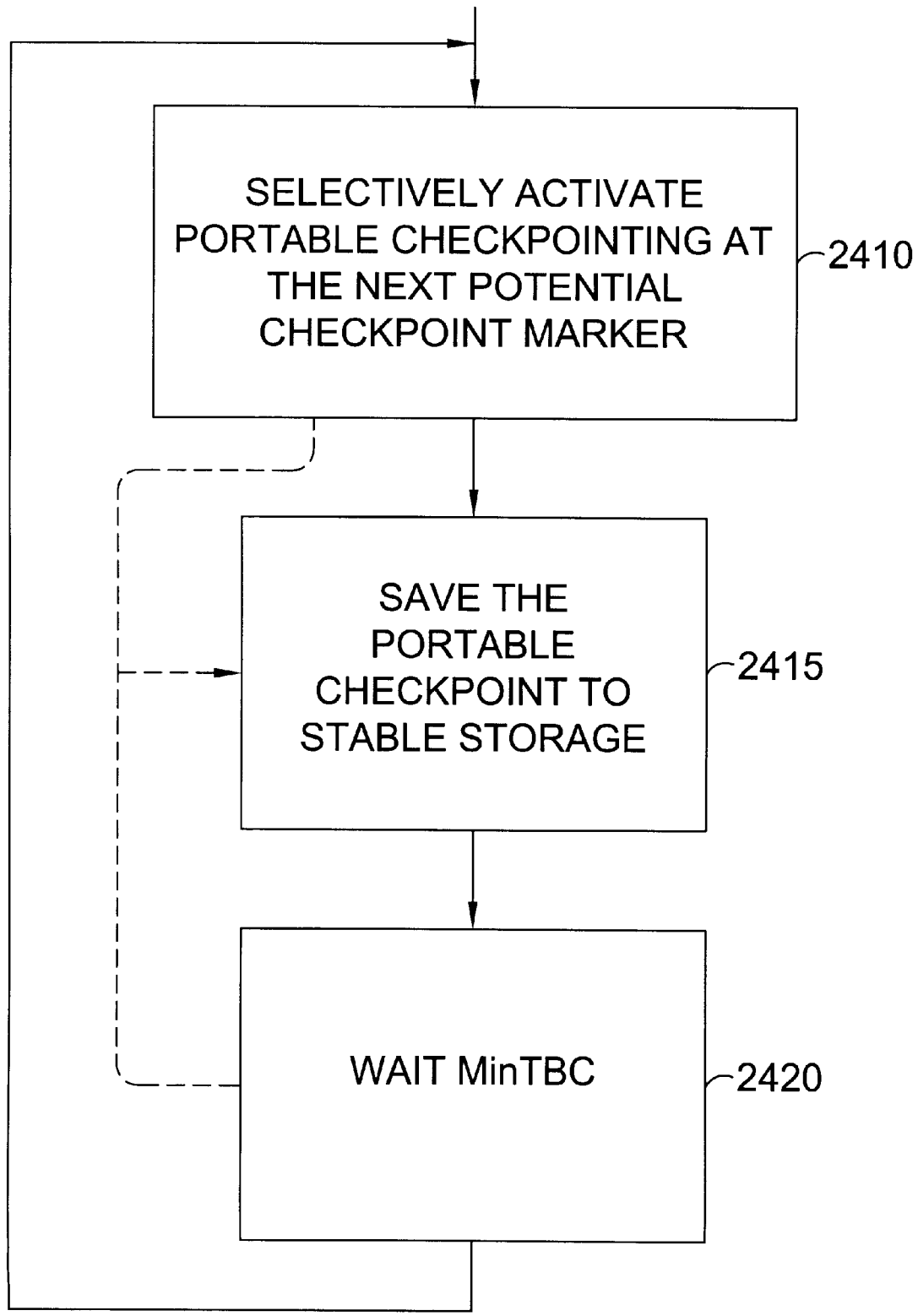
FIG. 24 shows a method for selectively activating portable checkpoints at the next potential checkpoint marker, according to a preferred embodiment of the invention.

FIG. 24 shows a method for selectively activating portable checkpoints at the next potential checkpoint marker, according to a preferred embodiment of the invention. As the code is executed, step 2410 selectively activates portable checkpointing at the next potential checkpoint marker. The method proceeds from step 2410 to step 2415 which involves saving the portable checkpoint to stable storage. The method proceeds from step 2415 to step 2420 which involves waiting MinTBC (Minimum Time Between Checkpoints) while program execution continues. This wait can be implemented, for example, by using a timer. If potential checkpoint markers are encountered during wait step 2420, they are ignored and not implemented.

After the timer expires, the method proceeds from step 2420 back to step 2410 which selectively activates portable checkpointing at the next potential checkpoint marker. This method of implementation greatly reduces the checkpoint overhead by not performing too many checkpoints, while simultaneously allowing reasonable recovery through the use of MinTBC so the checkpoints will not be spaced too far apart in time.

FIG. 24 also includes a further embodiment of the invention (shown with the dashed line) in which step 2410 proceeds to steps 2415 and 2420 approximately at the same time. This method is a non-blocking method in which wait step 2420 does not have to wait for completion of save step 2415.

Figure 25:
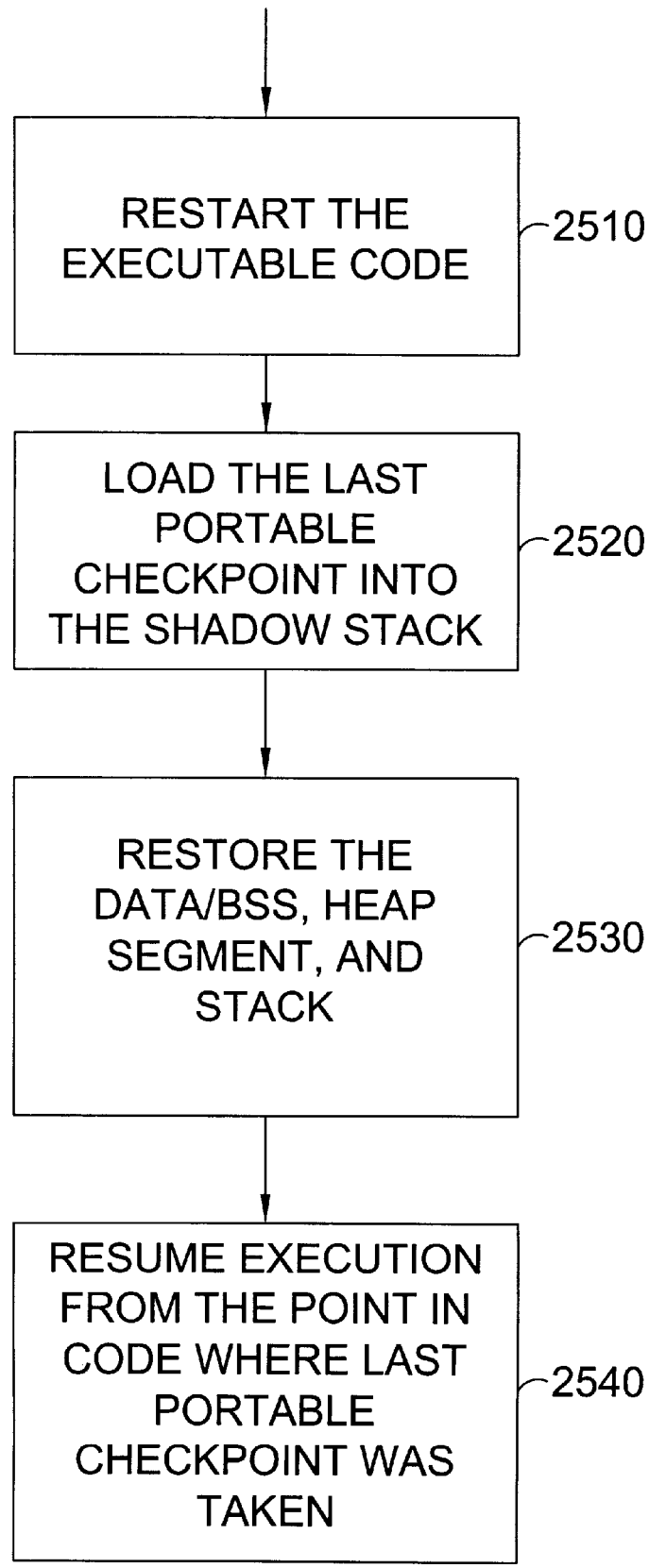
FIG. 25 shows a method for recovering from portable checkpoints, according to a preferred embodiment of the invention.

FIG. 25 shows a method for recovering from portable checkpoints, according to a preferred embodiment of the invention. The method begins at step 2510 which involves restarting the executable code. Restarting step 2510 can be part of a fault tolerant system in which recovery is started after a fault is detected or can be part of a multi-processor system in which the state of a process is being migrated from one processing platform to another processing platform. The processing platform includes not only computers, such as PCs or workstations, but any device which is processor-based such as embedded controllers.

The method proceeds from step 2510 to step 2520 which involves loading the last checkpoint into the shadow stack. The organization and use of the shadow stack has been extensively discussed in prior sections.

The method proceeds for step 2520 to step 2530 which involves restoring the data/bss, heap segment, and stack from the shadow stack in to their appropriate locations.

The method proceeds from step 2530 to step 2540 which involves resuming execution from the point in the code where the last portable checkpoint was taken.

Limitations

The generation of code to save and recover portable checkpoints by means of source-to-source pre-compilation is a powerful and versatile method. However, the approach has its limitations. The following problems will limit any solution for the problem of portable checkpointing of C programs:

Use of non-portable features in programs: If checkpoints are to be portable, it is essential that the programs being checkpointed themselves be portable.

Loss in floating point accuracy due to data representation conversion: This problem can only be addressed by conformance to standards.

Ambiguous type information when generating checkpointing code: If variables, for example, are declared as integers and casted to pointers, the checkpoint is likely to be incorrect. A similar ambiguity arises when interpreting the value of a union via fields of different type. This problem would not arise in programming languages with a strict type system.

Functions with side effects: If a function in a call sequence to a checkpoint causes side effects, and is called in expressions such as if conditions, it may not be possible to instrument such function calls for checkpointing without changing the program semantics. The programmer will need to clean up the code if c2ftc detects such a situation.

Conclusions

A method for portable checkpointing has been described including the runtime and pre-compiler support needed to implement portable checkpoints. Furthermore, it has been demonstrated that the overhead introduced by portable checkpointing is very low when reasonable checkpoint intervals are chosen, even without hiding the latency of transferring the checkpoint to remote storage. For programs with large checkpoints such as heat or matrix multiplication, network/disk performance is the primary obstacle, compared to which the overhead of saving a checkpoint on the shadow stack is negligible.

A universal checkpoint format (UCF) that permits checkpoints to be ported across UCF-compatible and UCF-incompatible systems has been developed. The overhead of converting checkpoints into a UCF-compatible format on non-UCF machines was found to be negligible except when the frequency of checkpointing was unrealistically high. Checkpoint portability was validated on the three systems reported by checkpointing the program on one system, transferring the checkpoint onto a different system, and successfully resuming the execution there.

The cost of recovery from failures in the method was found to be very low on UCF-compatible machines, and a little higher on UCF-incompatible machines. Our experiments show that the total volume of data that needs to be recovered is the determining factor in recovery cost; the system overhead is very small.

The instrumented versions of the benchmark programs were hand-translated to obtain the data reported in this paper.

The method according to one embodiment of the invention only requires that (1) a user program be submitted to a front-end source-to-source C pre-compiler before compilation on the desired target machine, and (2) the run time library be linked to produce the final executable. It does not limit the choice of compiler or impose any system-specific demands. This makes it easy to render any C program robust in the presence of faults and recoverable on any UNIX-based system.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for portable checkpointing comprising the steps of:
    pre-compiling an input source code of a selected programming language; and
    outputting an associated output source code which includes support for portable checkpointing, wherein the portable checkpointing provides a first portable checkpoint, and wherein said associated output source code using the first portable checkpoint can be executed on a destination platform that is not limited by (a) programming language restrictions of the selected programming language, (b) operating system level variations and (c) processor restrictions including memory page size, firmware byte-ordering and word size.

2. The method for portable checkpointing of claim 1, comprising the further step of:
    inserting markers for the support of portable checkpointing in original source code to produce the input source code.

3. The method for portable checkpointing of claim 1, comprising the further step of:
    compiling the associated output source code to produce executable code.

4. The method for portable checkpointing of claim 3, comprising the further steps of:
    executing the executable code; and
    producing portable checkpoints.

5. The method for portable checkpointing of claim 4, wherein said step of producing includes producing the portable checkpoints at checkpoint times, and wherein consecutive checkpoint times are spaced at greater than or equal to a minimum time between checkpoints.

6. The method for portable checkpointing of claim 4, wherein said step of producing includes selective activation of the portable checkpoints at runtime.

7. The method for portable checkpointing of claim 4, wherein the portable checkpoints are in a universal checkpoint format.

8. The method for portable checkpointing of claim 4, wherein each of the portable checkpoints is a contiguous area of memory.

9. The method for portable checkpointing of claim 4, wherein each of the portable checkpoints is a shadow stack, wherein the shadow stack is a data structure that maintains global variables, dynamically allocated variables and automatic stack variables defining the state of executing code.

10. The method for portable checkpointing of claim 4, wherein the portable checkpoints are minimal overhead portable checkpoints.

11. The method for portable checkpointing of claim 3, wherein the portable checkpointing is portable across at least two compilers.

12. The method for portable checkpointing of claim 1, wherein the portable checkpointing is portable across operating systems, wherein the operating systems (OSs) include at least two of a command driven compatible OS, a DOS compatible OS, a windows environment compatible OS and a network compatible OS.

13. The method for portable checkpointing of claim 12, wherein the command driven compatible OS includes Unix™ OS implementations and variants thereof, and wherein the windows environment compatible OS includes MacIntosh™ compatible OS and Windows '95™ compatible OS.

14. The method for recovering of claim 1, wherein the portable checkpoints are in a universal checkpoint format, wherein the universal checkpoint format can be adapted to the selected OS and the selected processor.

15. The method for portable checkpointing of claim 1, wherein the first portable checkpoint defines a state of an executing process of the output source code.

16. The method for portable checkpointing of claim 1, wherein the input source code includes a general-purpose programming language code.

17. The method for portable checkpointing of claim 1, wherein the pre-compiling step can compile one of C code, C++ code, Fortran code, and Java™ code.

18. The method for portable checkpointing of claim 1, wherein the support for portable checkpointing includes padding for data compatibility.

19. The method for portable checkpointing of claim 1, wherein the support for portable checkpointing includes jump tables at the entry of functions.

20. The method for portable checkpointing of claim 1, wherein the support for portable checkpointing includes function call wrappers in functions.

21. The method for portable checkpointing of claim 1, wherein the input source code includes call-by-reference.

22. The method for portable checkpointing of claim 1, wherein the pre-compiling and outputting steps can output source executable on two of a RISC compatible processor, an x86-family compatible processor, an alpha-compatible processor, and a multiprocessing compatible processor hardware platform.

23. An system for portable checkpointing, comprising:
    a marker inserter for receiving a selected language source code, and inserting markers for support of portable checkpointing to produce input source code; and
    a pre-compiler, coupled to said marker inserter, for pre-compiling the input source code and outputting an associated output source code that includes the support of portable checkpointing, wherein the support for portable checkpointing in the associated output source code is selectively executable on each of a RISC compatible processor, an x86-family compatible processor, an alpha-compatible processor, and a multiprocessing compatible processor hardware platform.

24. The apparatus for portable checkpointing of claim 23, further comprising:
a compiler, coupled to said pre-compiler, for compiling the associated output source code to produce executable code.

25. The apparatus for portable checkpointing of claim 23, wherein the portable checkpointing is portable across at least two compilers.

26. The apparatus for portable checkpointing of claim 23, wherein the portable checkpointing is portable across operating systems.

27. The apparatus for portable checkpointing of claim 23, wherein the portable checkpointing is portable across hardware platforms.

28. The apparatus for portable checkpointing of claim 23, wherein the portable checkpointing is in a universal checkpoint format.

29. The apparatus for portable checkpointing of claim 23, wherein the portable checkpointing uses a contiguous area of memory.

30. The apparatus for portable checkpointing of claim 23, wherein the portable checkpointing uses a shadow stack.

31. The method for portable checkpointing of claim 23, wherein multiplatforms include various off-the-shelf operating system and off-the-shelf processor combinations.

32. An apparatus for general purpose checkpointing, comprising:
a pre-compiler for pre-compiling an input source code that is independent of application semantics and outputting an associated output source code which includes support of portable checkpointing and the generation of portable checkpoints, wherein the associated output source code that includes support for portable checkpointing can regenerate memory that was dynamically-allocated during execution.

33. The apparatus for portable checkpointing of claim 32, wherein the associated output source code that includes the support of portable checkpointing is processor independent and can selectively compile with no modification to executable code of the input source code and execute on two processors that are binary-incompatible.

34. The method for portable checkpointing of claim 33, wherein binary-incompatible features of byte-ordering, word-ordering and word size.

35. A method for selectively activating portable checkpointing in output source code which includes potential checkpoint markers, comprising the steps of:
selectively activating, at run time, portable checkpointing at the next potential checkpoint marker; and
producing an associated portable checkpoint in the output source code that is independent of operating system restrictions and processor restrictions including one of memory page size, firmware byte-ordering and word size for a destination operating system and processor that will execute the portable checkpoint.

36. The method of claim 35, comprising the further step of:
saving the portable checkpoint to a stable storage, wherein the associated portable checkpoint is capable of regenerating dynamically-allocated memory.

37. The method of claim 36, comprising the further step of:
waiting a minimum time between checkpoints before repeating said selectively activating step.

38. The method of claim 35, comprising the further step of:
waiting a minimum time between checkpoints before repeating said selectively activating step.

39. The method of claim 35, wherein said waiting step is executed after the completion of said saving step.

40. The method of claim 35, wherein said waiting step is executed concurrently with said saving step.

41. The method of claim 40, wherein said saving step includes latency hiding.

42. A method for checkpoint recovery using portable checkpoints, comprising the steps of:
performing execution of an executable code with the portable checkpoints in a first operating system and processor platform;
restarting the executable code on a second operating system and processor platform;
loading a first portable checkpoint taken on the first operating system and processor platform onto the second operating system and processor platform; and
resuming execution of the executable code on the second operating system and processor platform from a point in the executable code where the first portable checkpoint was taken, wherein the first portable checkpoint is independent of the first and second platforms executing the executable code.

43. The method for recovering of claim 42, wherein the portable checkpoints are fault tolerant portable checkpoints.

44. The method for recovering of claim 42, wherein the portable checkpoints are distributed processing portable checkpoints.

45. The method for recovering of claim 42, wherein the portable checkpoints are load balancing portable checkpoints.

46. The method for recovering of claim 42, wherein the portable checkpoints are suspension and subsequent execution portable checkpoints.

47. The method for recovering of claim 42, wherein the portable checkpoints are diagnostic portable checkpoints.

48. The method for recovering of claim 42, wherein said step of loading includes loading the recovery portable checkpoint into a shadow stack.

49. The method for recovering of claim 42, comprising the further step of:
restoring at least one of data/bss, heap segment, and stack.

50. The method for recovering of claim 42, wherein the recovery portable checkpoint is a last portable checkpoint.

51. The method of claim 42, wherein the OS is selectable from each of a command driven compatible OS, a DOS compatible OS, a windows environment compatible OS and a network compatible OS, and wherein the processor is selectable from all of a RISC compatible processor, an x86-family compatible processor, an alpha-compatible processor, and a multiprocessing compatible processor hardware platform.

* * * * *